United States Patent
Visser

(10) Patent No.: US 9,139,238 B2
(45) Date of Patent: Sep. 22, 2015

(54) DRAG REDUCTION OF A TRACTOR TRAILER USING GUIDE VANES

(71) Applicant: Kenneth D. Visser, Potsdam, NY (US)

(72) Inventor: Kenneth D. Visser, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 0 days.

(21) Appl. No.: 14/171,205

(22) Filed: Feb. 3, 2014

(65) Prior Publication Data

US 2014/0292023 A1 Oct. 2, 2014

Related U.S. Application Data

(60) Provisional application No. 61/759,701, filed on Feb. 1, 2013.

(51) Int. Cl.
*B62D 35/00* (2006.01)

(52) U.S. Cl.
CPC .................... *B62D 35/001* (2013.01)

(58) Field of Classification Search
CPC ..................................... B62D 35/001
USPC ........................... 296/180.4, 180.5
See application file for complete search history.

(56) References Cited

U.S. PATENT DOCUMENTS

| | | | | |
|---|---|---|---|---|
| 3,960,402 | A * | 6/1976 | Keck | 296/180.4 |
| 3,999,797 | A * | 12/1976 | Kirsch et al. | 296/180.4 |
| 4,406,491 | A * | 9/1983 | Forster | 296/180.3 |
| 4,601,508 | A * | 7/1986 | Kerian | 296/180.4 |
| 5,280,990 | A * | 1/1994 | Rinard | 296/180.1 |
| 8,007,030 | B2 * | 8/2011 | Wood | 296/180.4 |
| 8,403,400 | B2 | 3/2013 | Brewer | |
| 8,746,779 | B1 * | 6/2014 | Mazyan | 296/180.2 |
| 2006/0232102 | A1 * | 10/2006 | Steel | 296/180.1 |
| 2007/0024087 | A1 * | 2/2007 | Skopic | 296/180.4 |
| 2010/0201153 | A1 * | 8/2010 | Pesotini, Jr. | 296/180.4 |
| 2010/0225143 | A1 * | 9/2010 | Skopic | 296/180.2 |
| 2011/0068603 | A1 * | 3/2011 | Domo et al. | 296/180.1 |
| 2011/0115254 | A1 * | 5/2011 | Skopic | 296/180.3 |
| 2011/0181072 | A1 * | 7/2011 | Kempster | 296/180.5 |
| 2012/0038183 | A1 * | 2/2012 | Brewer | 296/180.1 |
| 2013/0076068 | A1 * | 3/2013 | Wayburn et al. | 296/180.4 |
| 2014/0252799 | A1 * | 9/2014 | Smith | 296/180.4 |

OTHER PUBLICATIONS

Montoya, Lawrence C. and Steers, Louis L., Aerodynamic Drag Reduction Tests on a Full Scale Tractor-Trailer Combination with Several Add-On Devices, NASA Flight Research Center, Dec. 1974.
Margano, D., Visser, K.D., The Effects of Aft Cavity Inset and Boat Tail Angle on Drag Reduction of Tractor Trailers, Clarkson University Department of Mechanical and Aeronautical Engineering, May 2003.
Kato, S., Fujimoto, T., Watanabe, H., Form Drag Reduction of a Bluff-Based Body with the Aid of Thin Circular-Arc Vanes, The Japan Society of Mechanical Engineers.

* cited by examiner

*Primary Examiner* — Jason S Morrow
(74) *Attorney, Agent, or Firm* — George R. McGuire; Frederick J. M. Price; Bond Schoeneck & King, PLLC

(57) ABSTRACT

The present invention relates to a vehicle having an apparatus mounted thereon for reducing aerodynamic drag and, more particularly, to a guide vane apparatus with an airfoil cross-section mounted to the aft portion of a tractor trailer.

7 Claims, 17 Drawing Sheets

Airfoil Vane Concept on the Model

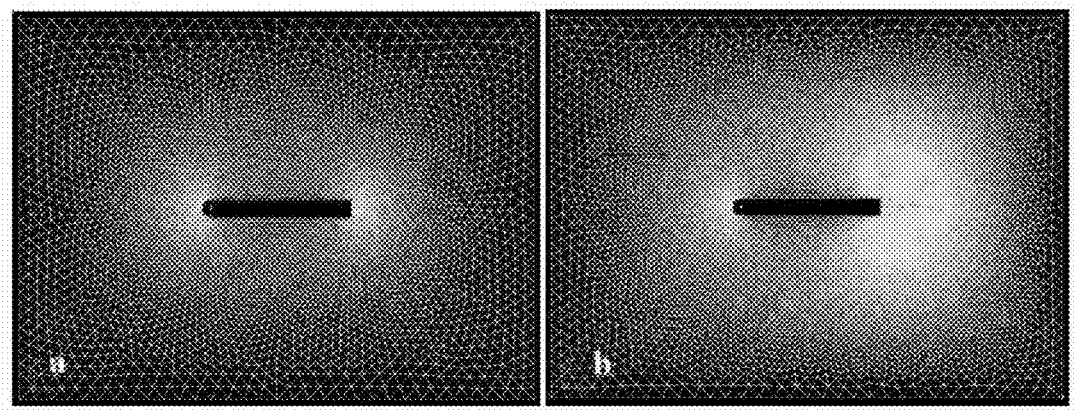
Figure 1: Meshes for Bluff Body Models
a) Baseline Model; b) Open Cavity Model
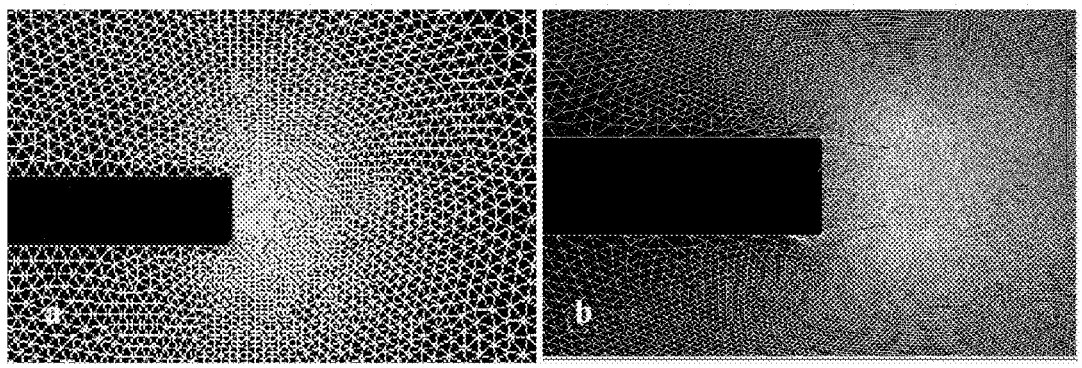
Figure 2: Close up Mesh of Aft Device
a) Baseline Model; b) Open Cavity Model

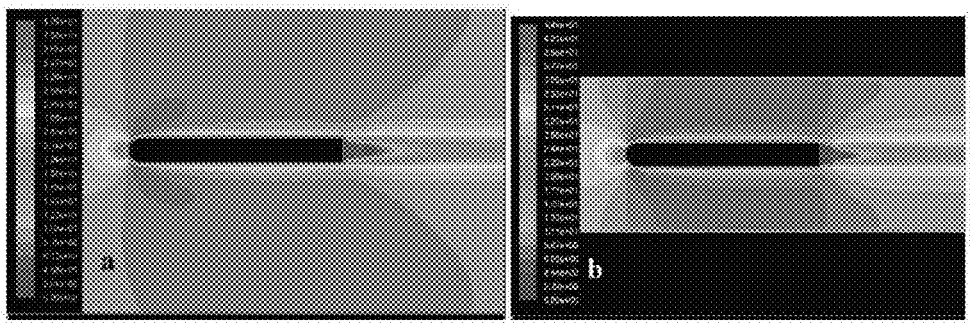
Figure 3: comparison of Velocity Contour Plots at Highway Speeds
a) Baseline Model; b) Open Cavity Model
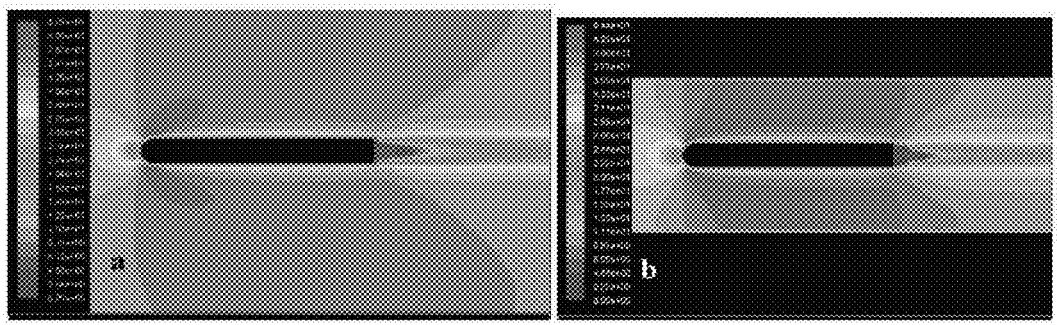
Figure 4: Comparison of Total Pressure Contour Plots at Highway Speeds
a) Baseline Model; b) Open Cavity Model

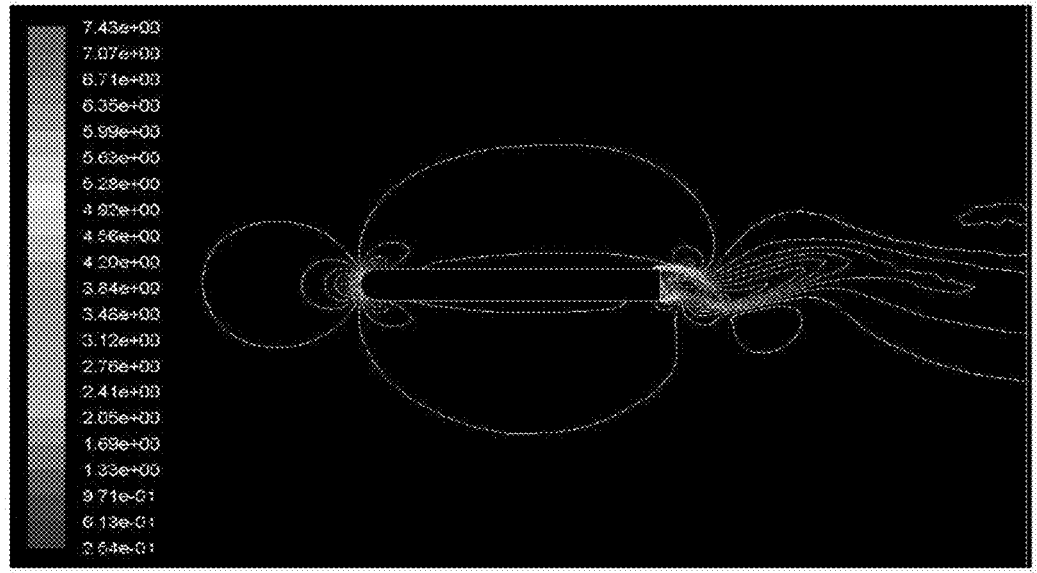
Figure 5: Bluff Body Flow Field in Oscillating Wake
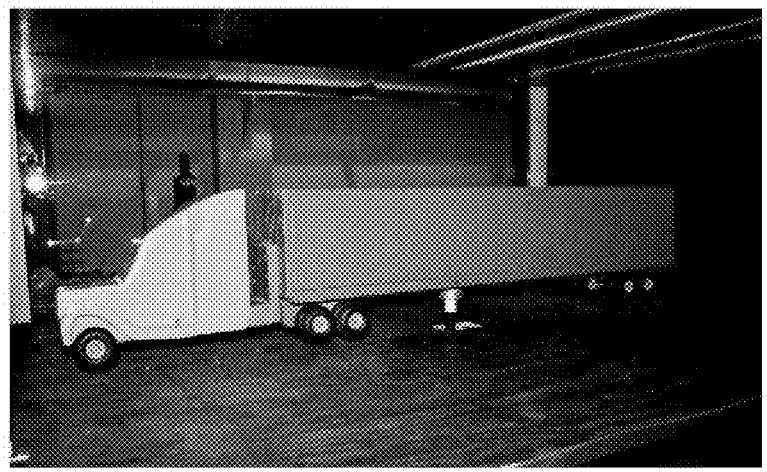
Figure 6: Tractor trailer model in wind tunnel

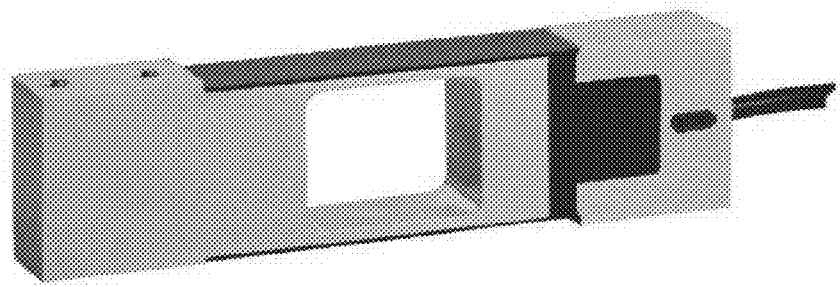
Figure 7: Flintec PC42 10 kg Load Cell
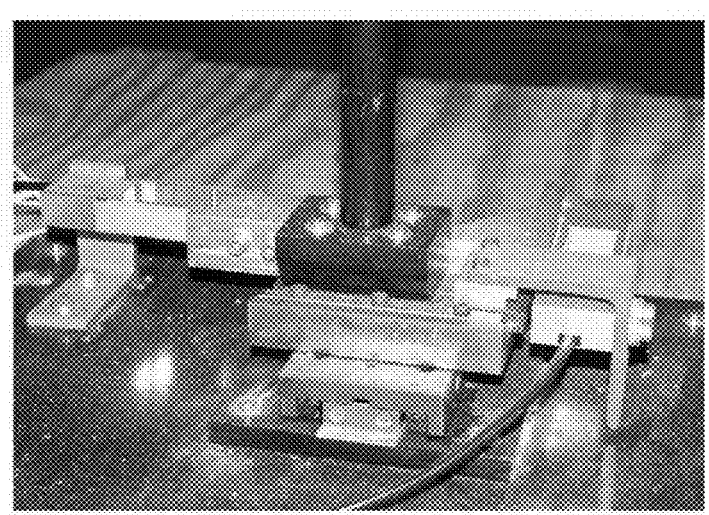
Figure 8: Force Balance Set-up

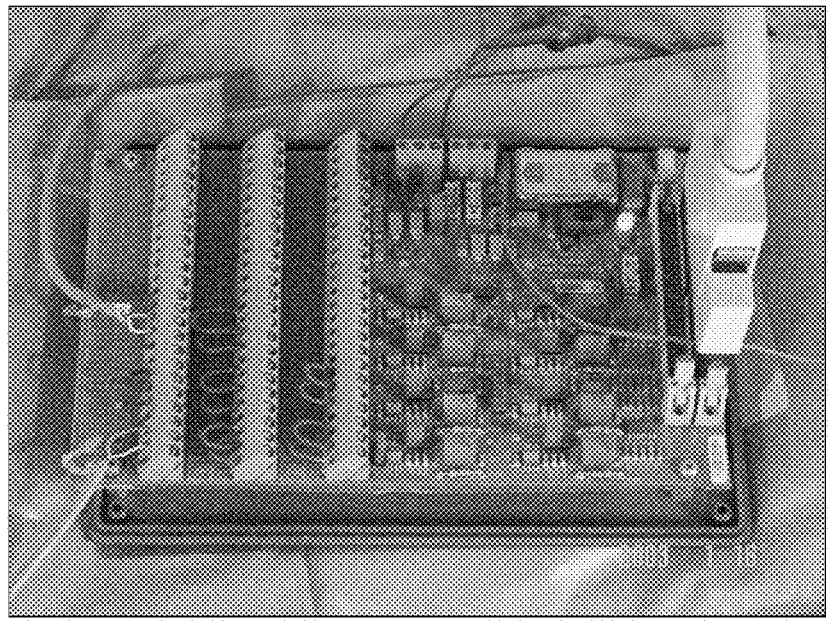
Figure 9: Data Acquisition Board
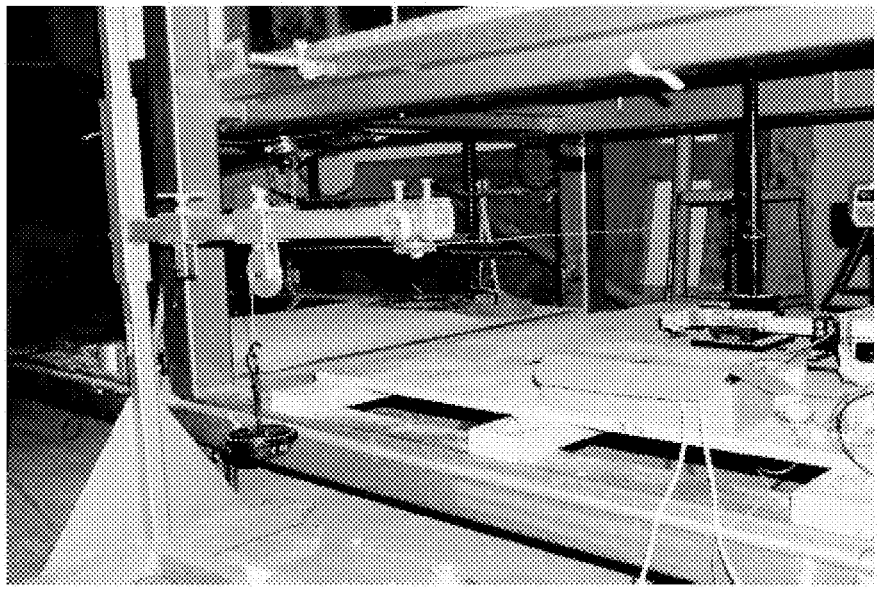
Figure 10: Calibration device

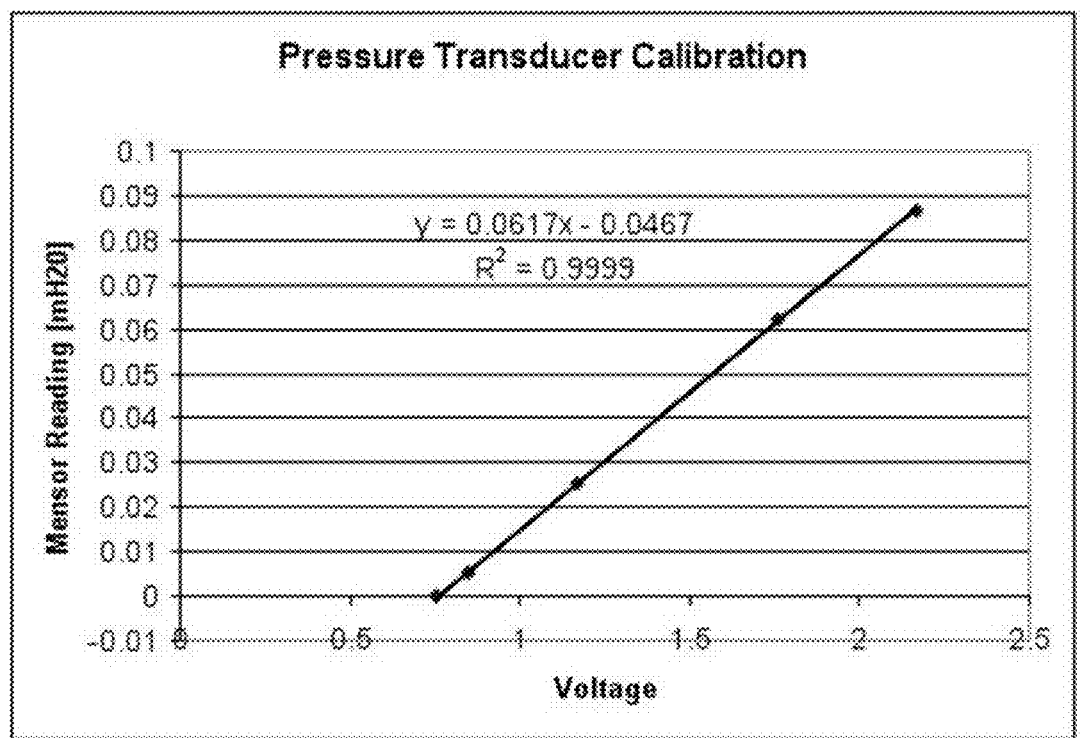
Figure 11: Sample Calibration Curve
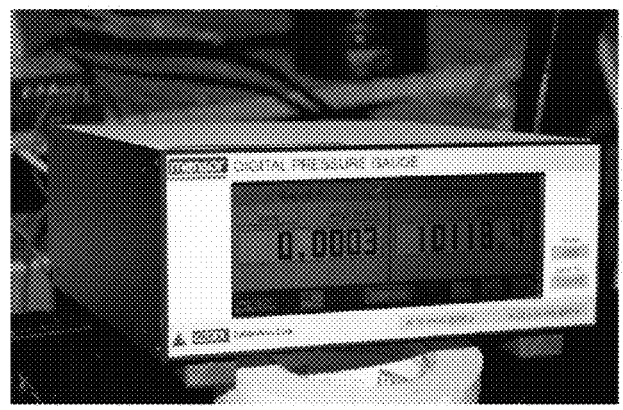
Figure 12: Mensor Series 2500 Digital Pressure Gauge

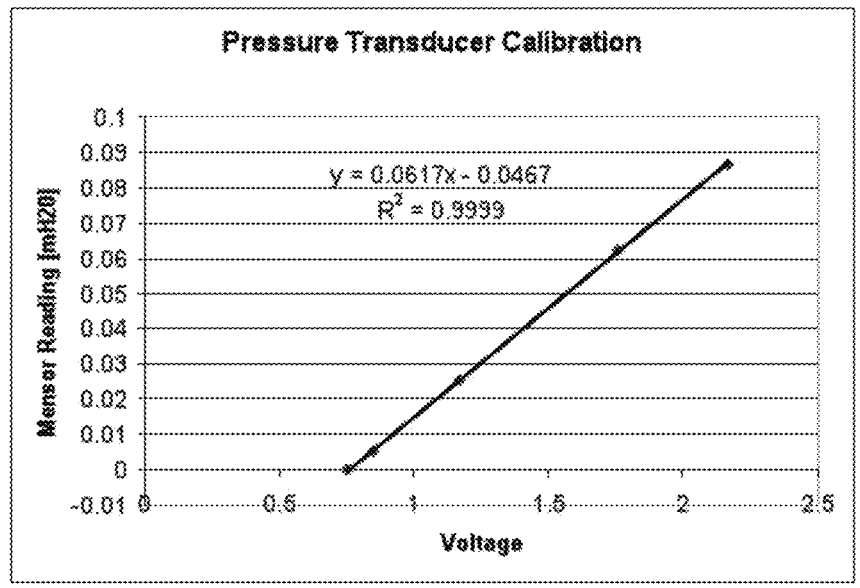
Figure 13: Pressure Transducer Calibration Curve
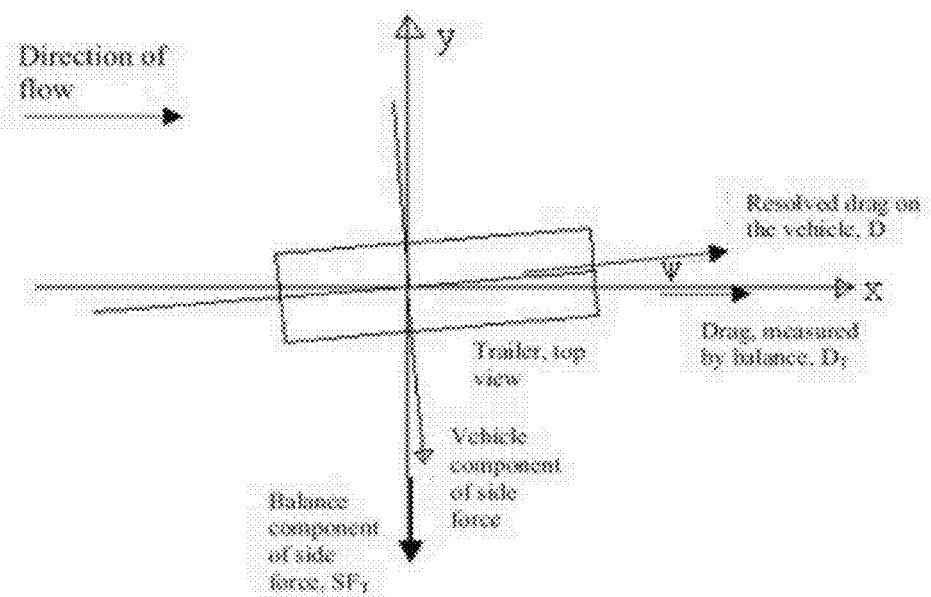
Figure 14: Side and Drag Force Schematic

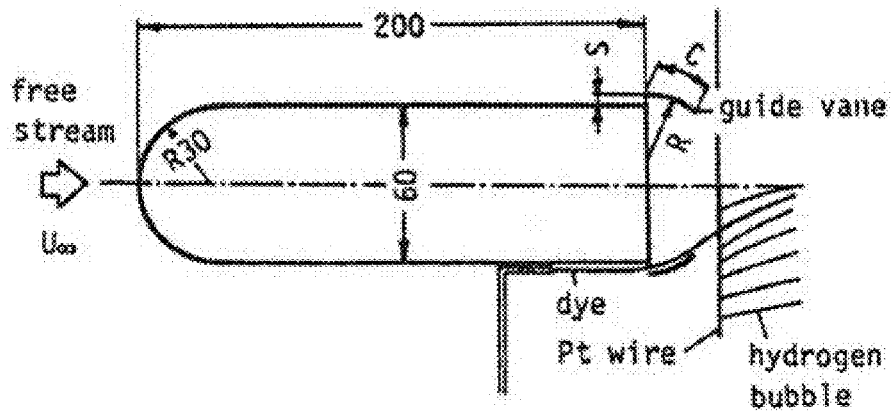
Figure 15: Kato Experimental Set-up
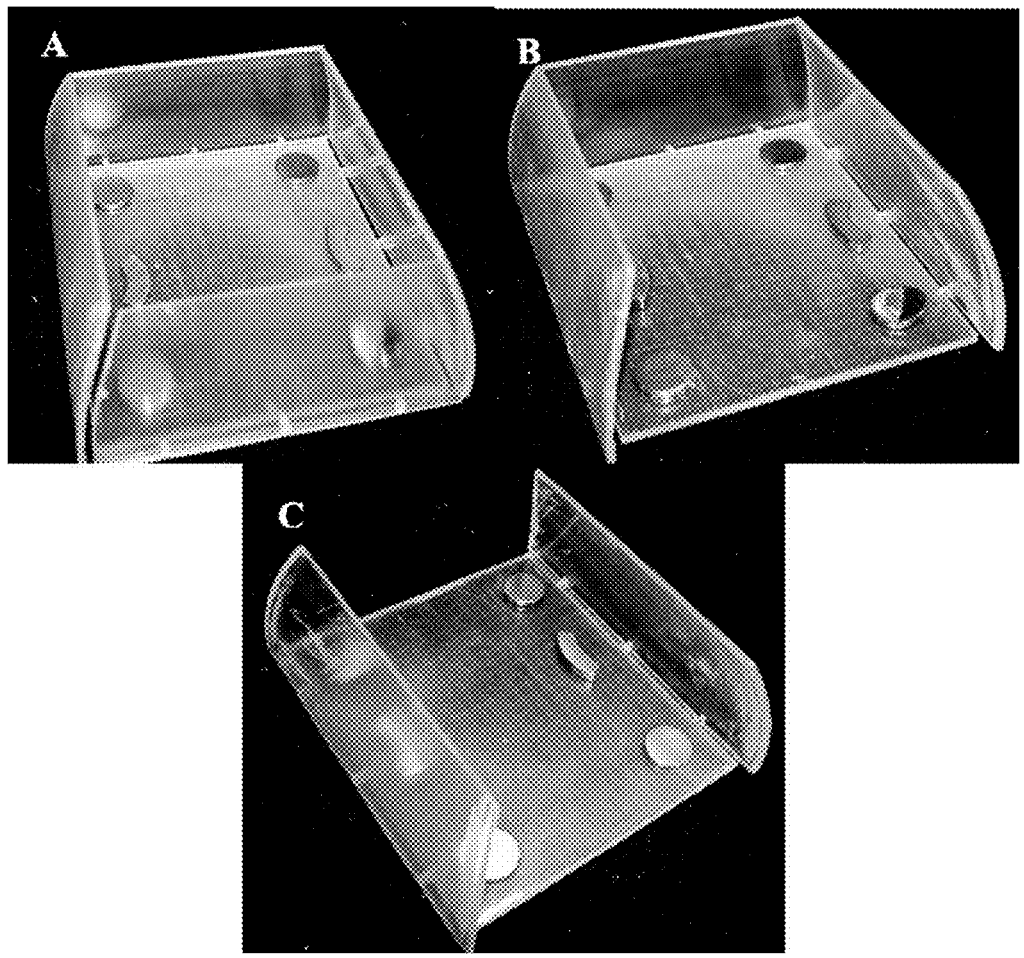
Figure 16: Initial Vaned Design Model Configurations

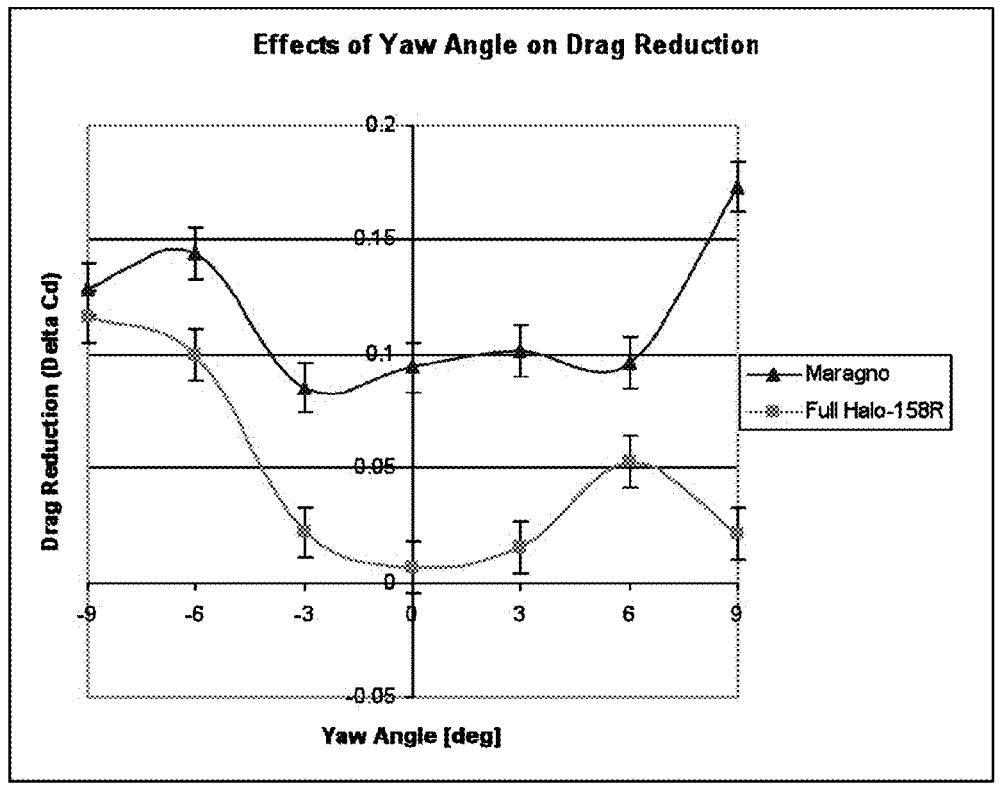
Figure 17: Effects of Yaw Angle on Drag Reduction, $\Delta C_D$
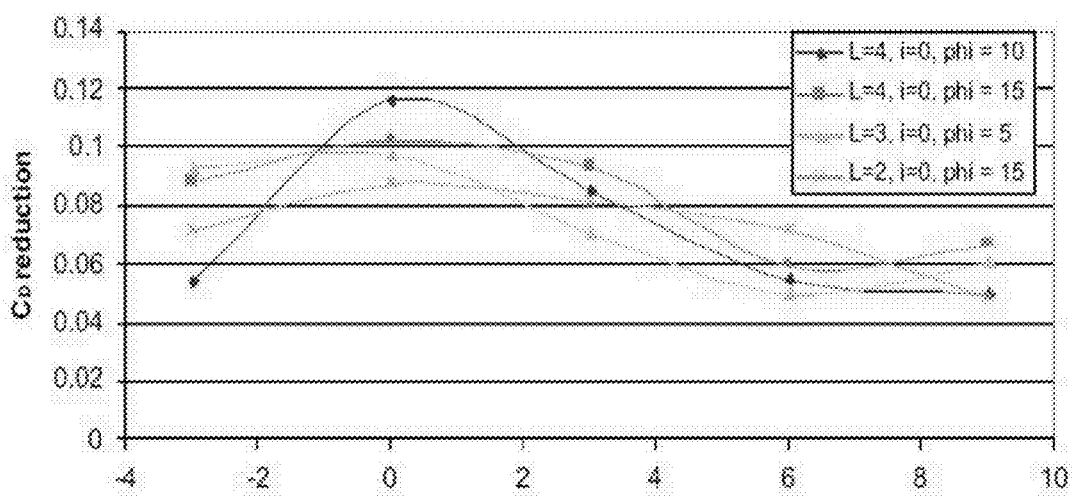
Figure 18: Maragno's Yaw Angle Results

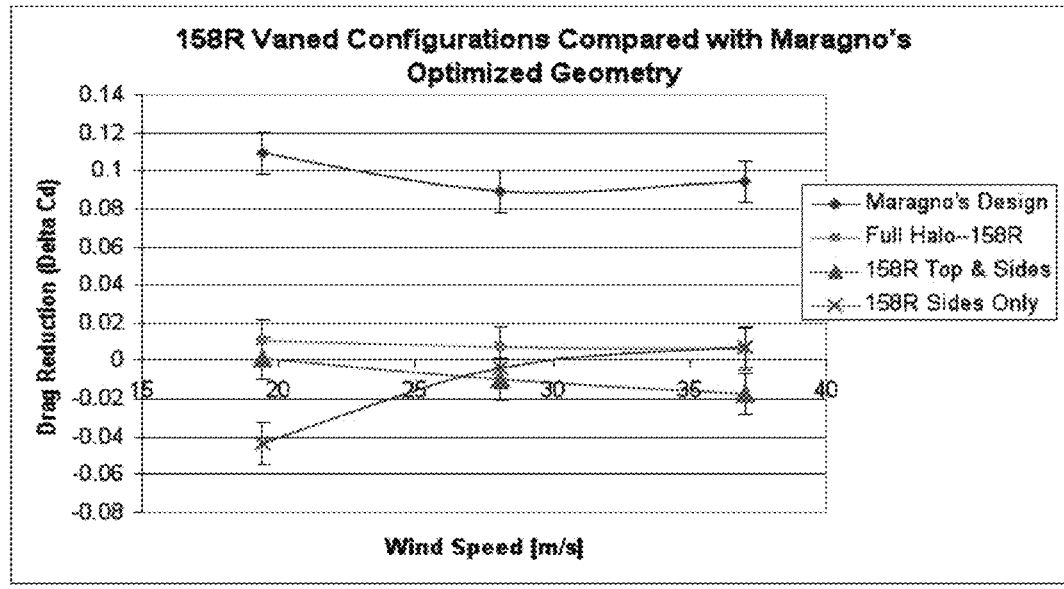
Figure 19: 158R Vaned Configurations
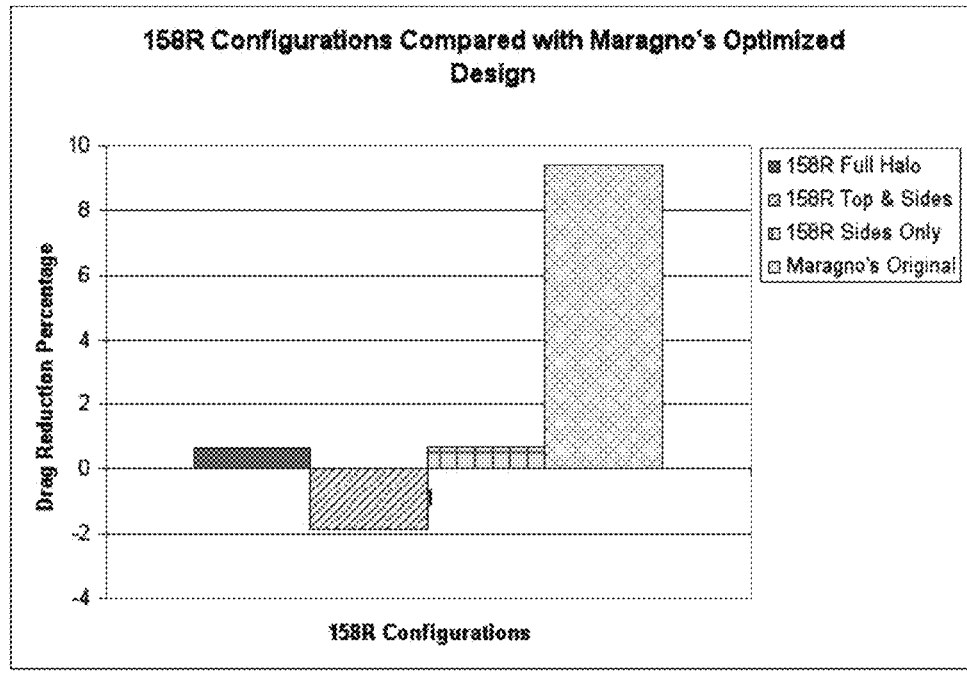
Figure 20: Performance Comparison of Configurations on Basis of Drag Reduction Percentage

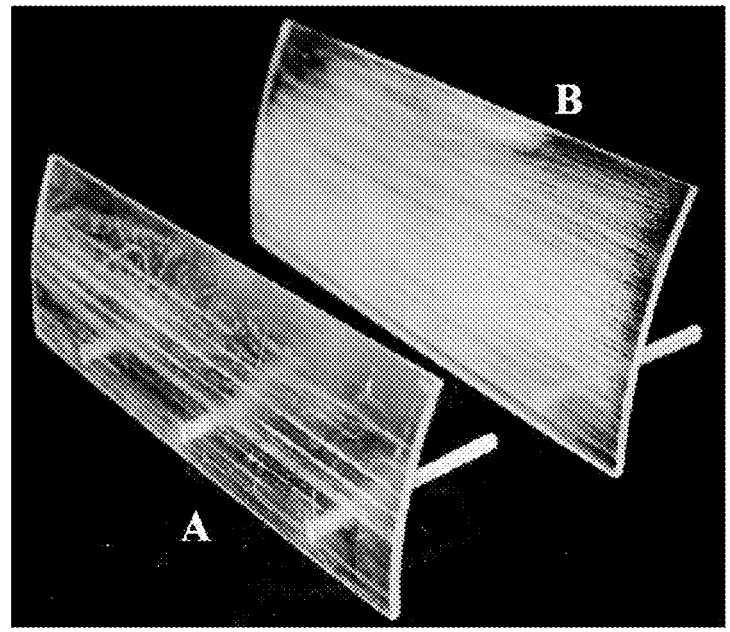
Figure 21: Comparison of 124R-62C and 158R-79C vanes
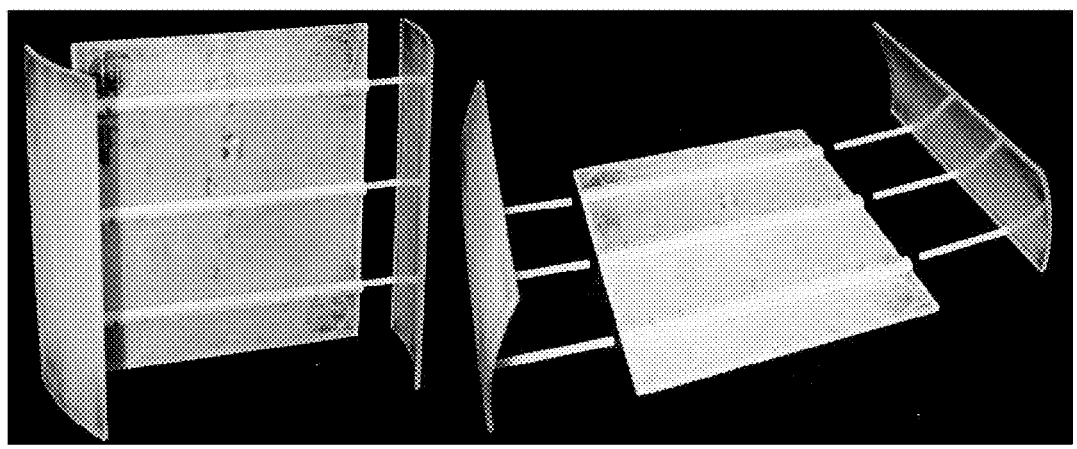
Figure 22: Kato Geometry Set-up with Vanes and Back plate

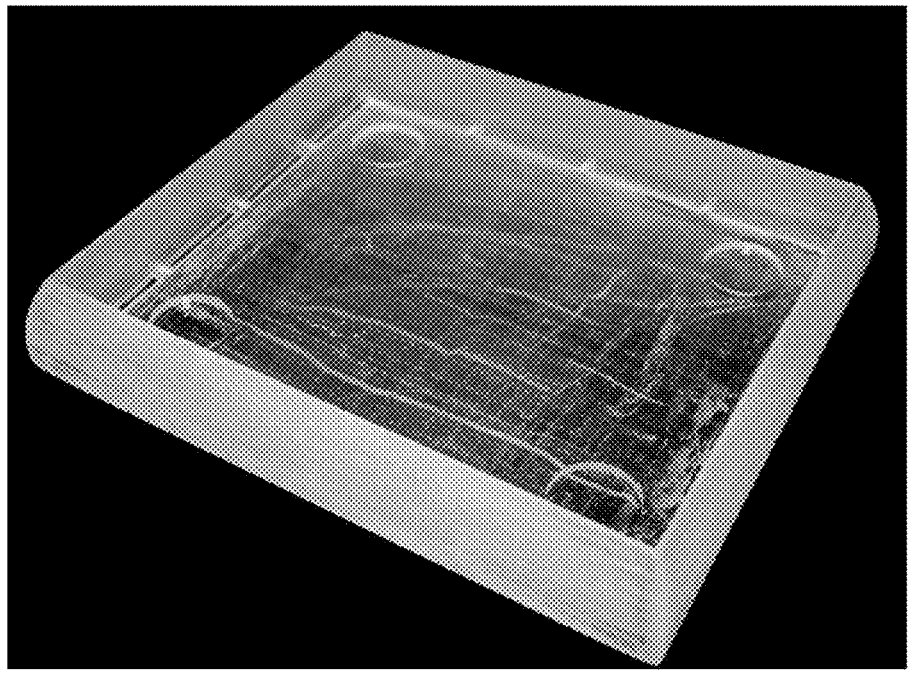
Figure 23: Airfoil Vane Geometry
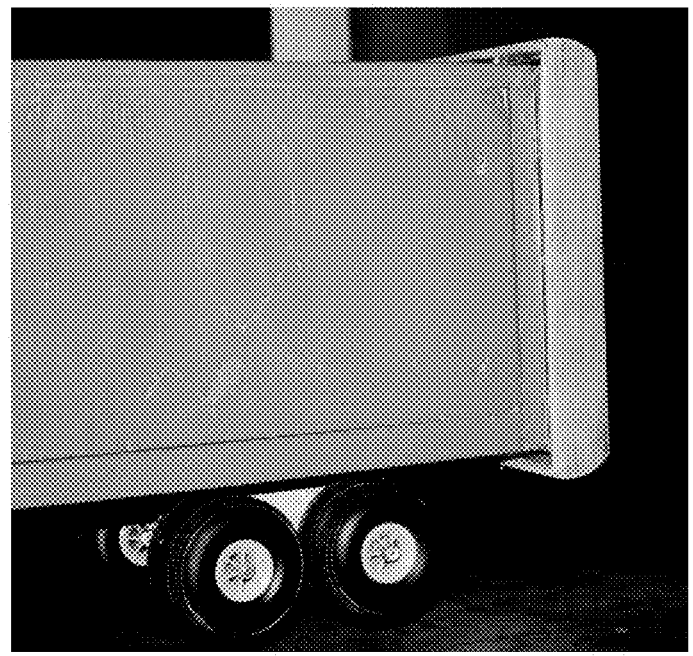
Figure 24: Airfoil Vane Concept on the Model

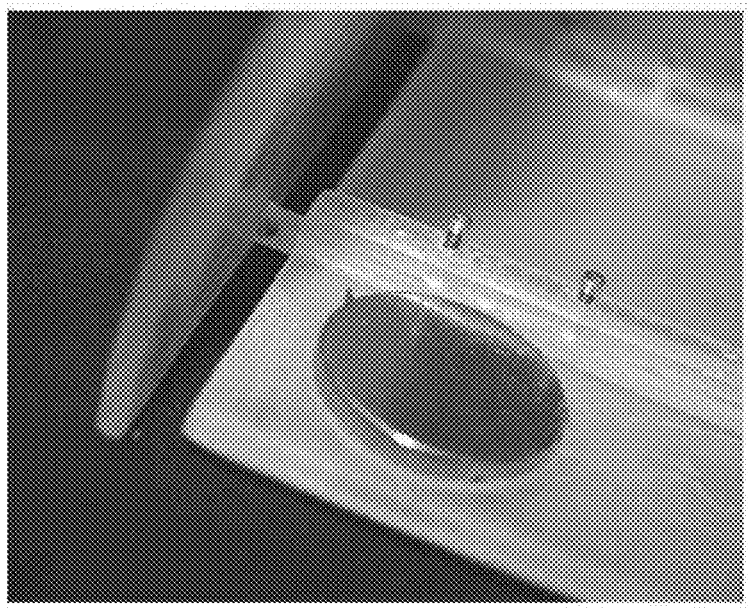
Figure 25: Close-up of vane offset and set screw assembly
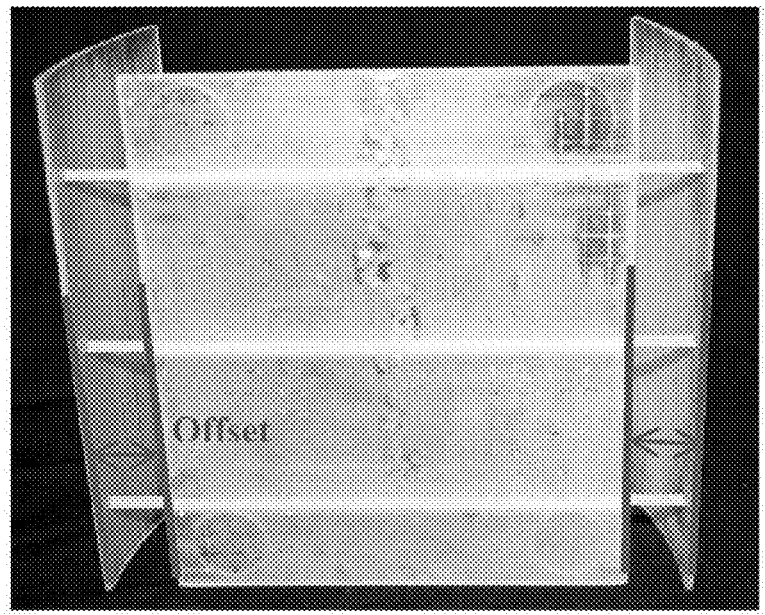
Figure 26: Offset Dimension

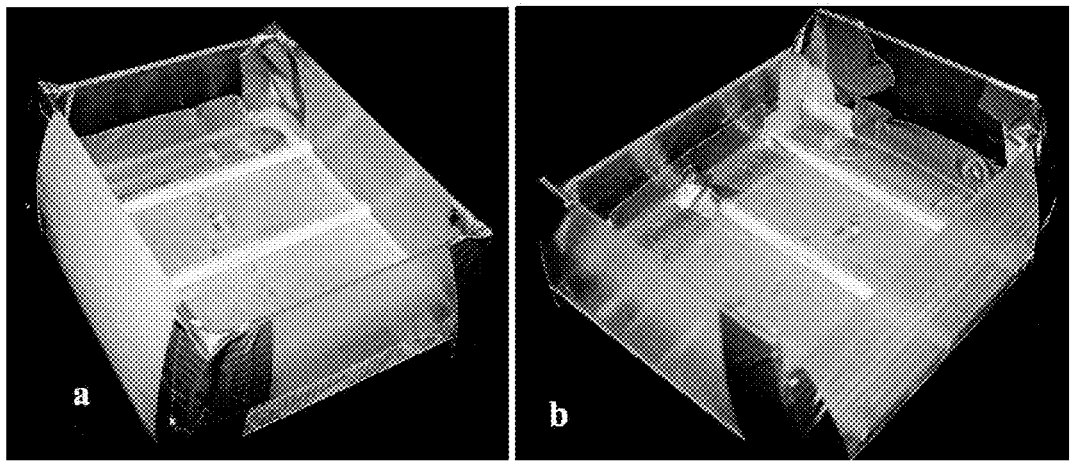
Figure 27: Sealed Cavity Improvised Designs
a) 158R geometry; b) 124R configuration, with 158R top and bottom
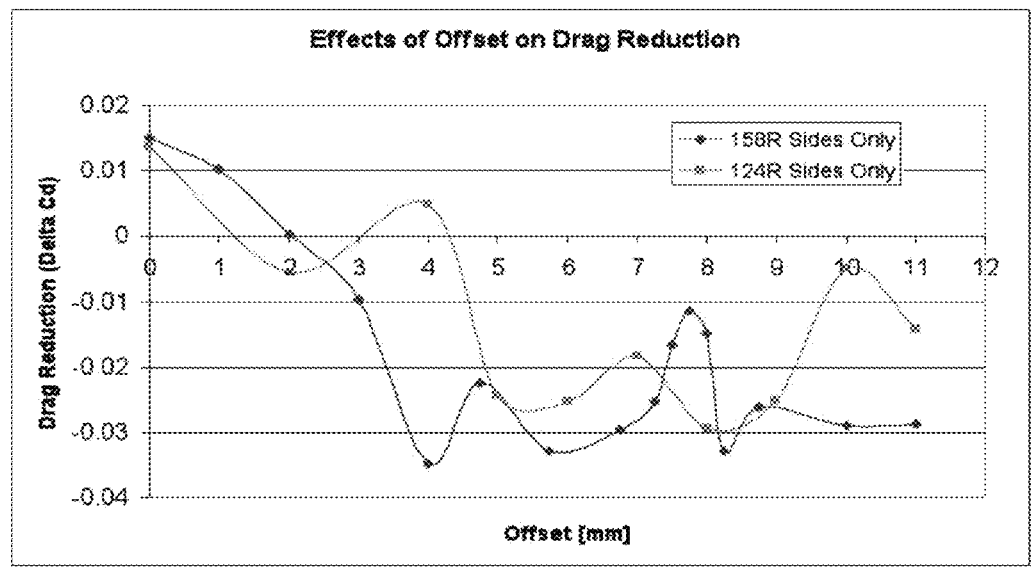
Figure 28: Offset Effects on Drag Reduction

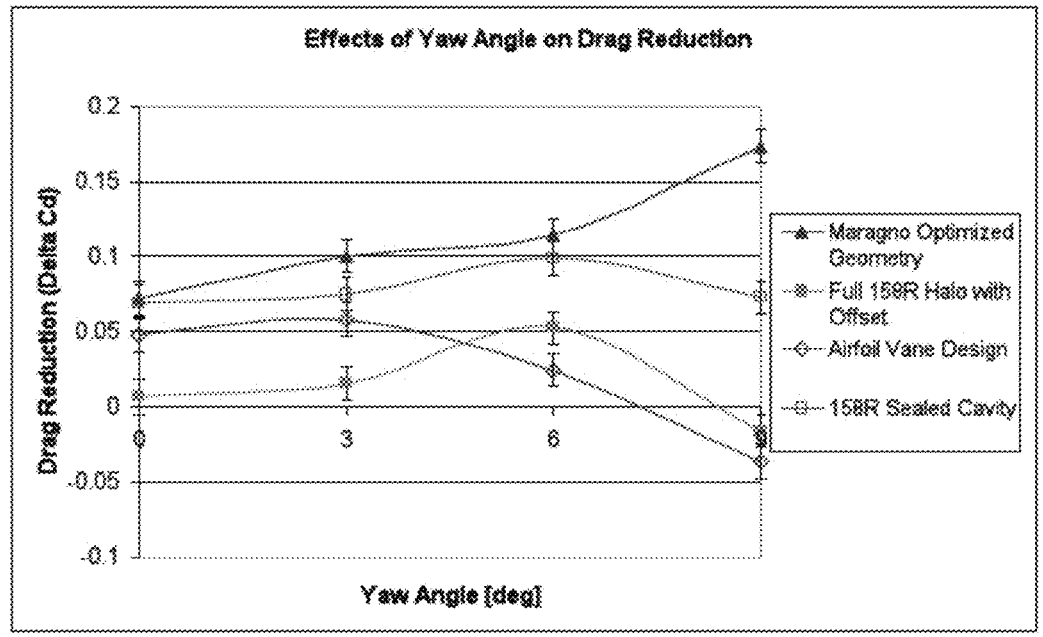
Figure 29: Final Yaw Angle Investigation Results
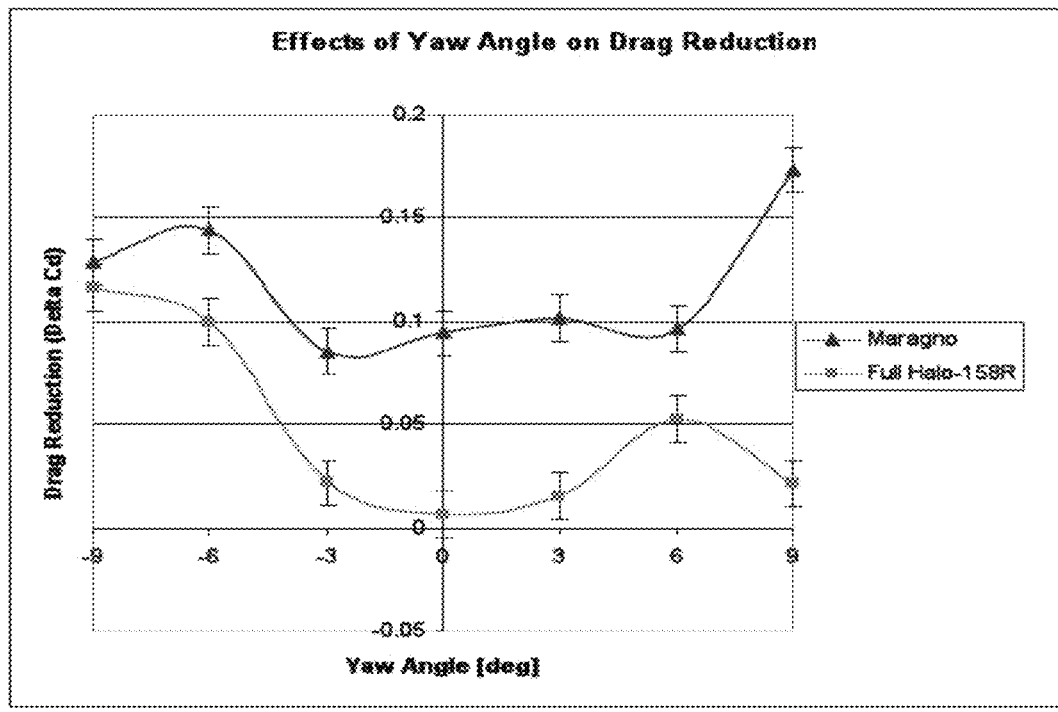
Figure 30: Initial Yaw Angle Study Results

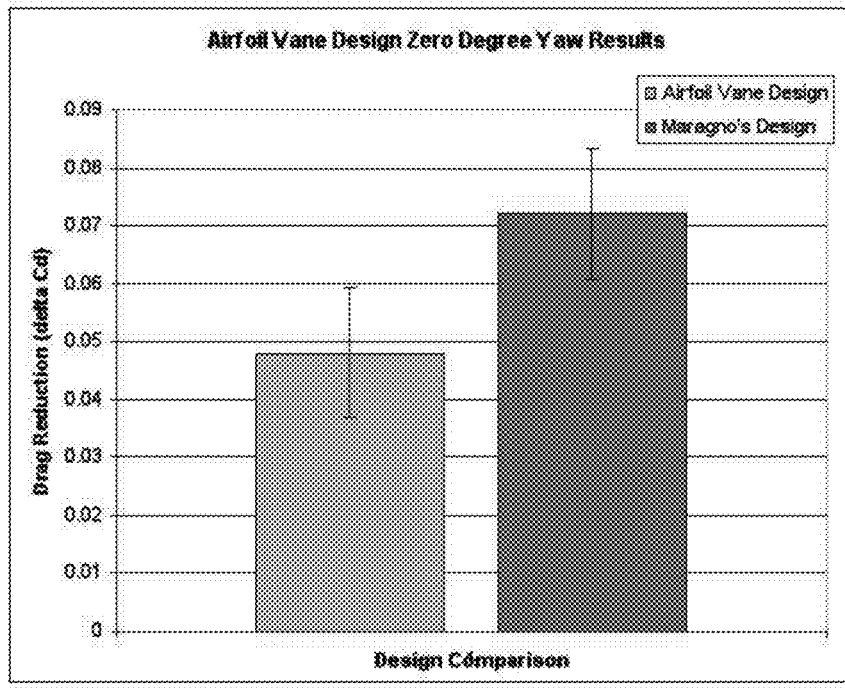
Figure 31: Airfoil Vane $\Delta C_D$ Results
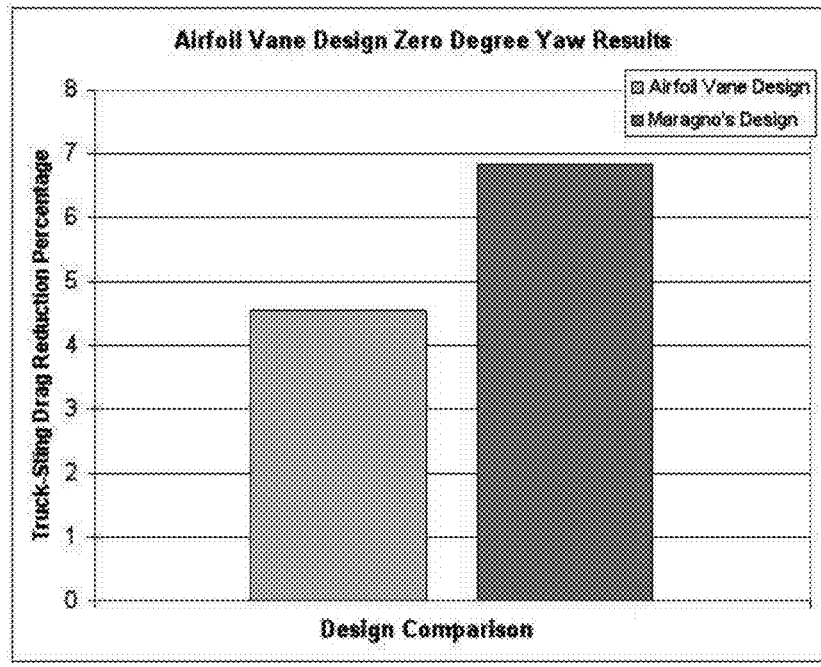
Figure 32: Airfoil Vane Drag Reduction Percentage Results

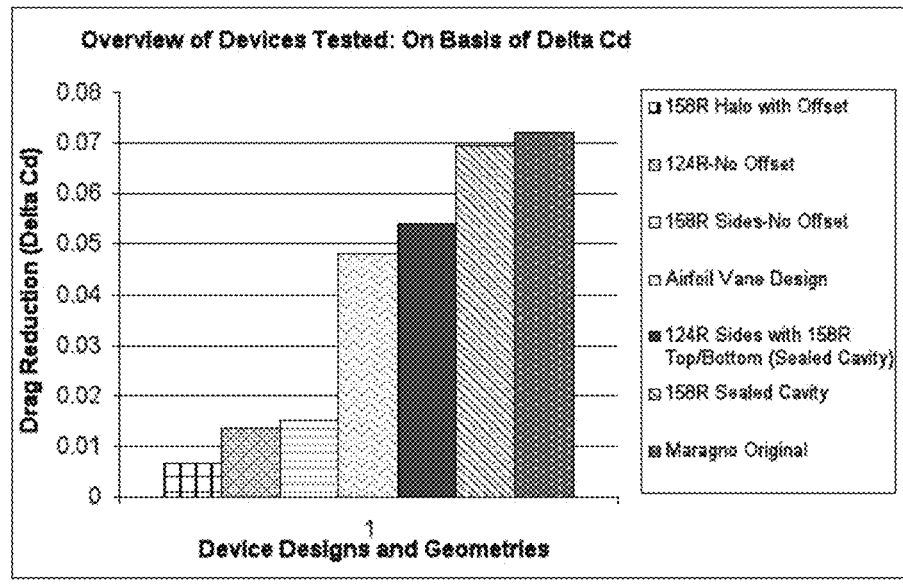
Figure 33: Summary of devices tested on basis of $\Delta C_D$
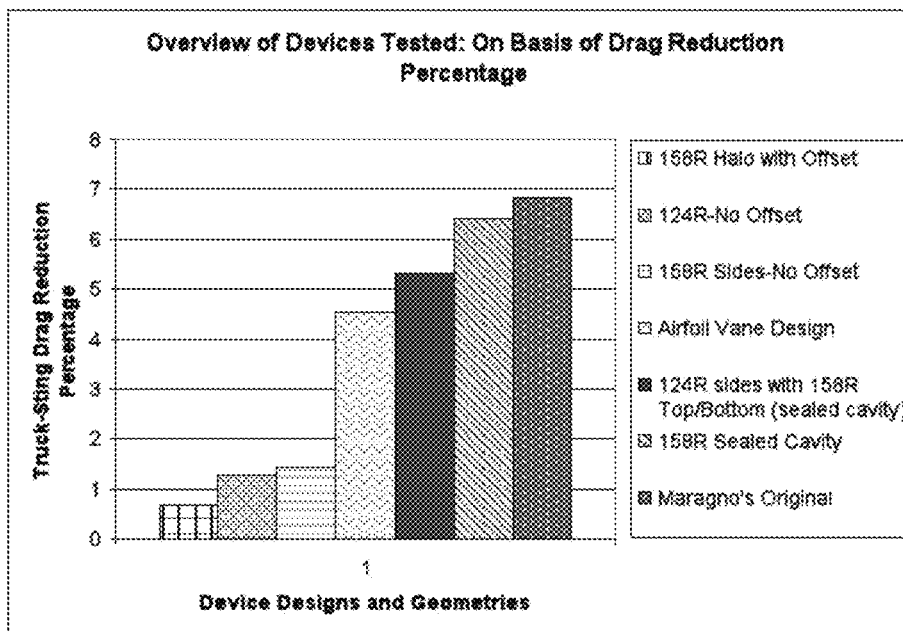
Figure 34: Summary of devices tested on basis of drag reduction percentage

DRAG REDUCTION OF A TRACTOR TRAILER USING GUIDE VANES

RELATED APPLICATION DATA

The present application claims the benefit of U.S. provisional patent application No. 61/759,701, filed Feb. 1, 2013, and is hereby incorporated by reference in its entirety.

BACKGROUND OF THE INVENTION

1. Field of the Invention

The present invention relates to a vehicle having an apparatus mounted thereon for reducing aerodynamic drag and, more particularly, to a guide vane apparatus with an airfoil cross-section mounted to the aft portion of a tractor trailer.

2. Description of the Related Art

Reducing the fuel consumption of passenger vehicles is an urgent world issue that is currently being addressed by scientists and engineers. In addition to passenger cars on American roadways, the US Department of Transportation (2006) reported that there were 2,010,335 combination tractor trailers registered in service in 2005. The average number of miles each vehicle traveled per year was approximately 72,325 miles and over 24.7 billion gallons of fuel was consumed.

At highway speeds, a modern tractor trailer uses 65% of the total engine power to simply overcome drag. A tractor trailer's geometric features contribuuteto the overall drag of the vehicle. At this kind of average road mileage, a 5 percent reduction in fuel consumption would result in billions of dollars of savings for the transportation business, and have an undeniably positive environmental impact.

ATDynamics is a California-based company specializing in tractor trailer aerodynamic solutions. According to the firm, a design with the ability to reduce drag by 12-20% results in a 5.1% fuel efficiency gain at 62 mph. This means that at diesel prices of $3 per gallon, the long-haul trucking industry will realize savings of $1,000-$5,000 per trailer per year. This figure is based on a baseline long-haul trailer traveling 40,000 to 200,000 miles per year at 62 miles per hour.

As fuel costs continue to increase, the need for improved aerodynamic strategies cannot be overemphasized. It has been noted that that the benefits of drag reduction are threefold: reduced fuel consumption, increased acceleration, and increased top speed.

Today there are numerous start-up companies in the United States dedicated to delivering fuel efficient technologies to the trucking industries. Within the most competitive of these companies, in addition to cab fairings, aerodynamic side skirts and wheel covers, there has arisen a strong push towards marketing a device aimed to reduce aft drag in tractor trailers. Solus Inc. is one company that focuses on consultation, research and product development for aerodynamic devices for ground transportation industry. On their website, they detail six different flow modification devices, including side skirts, cross flow vortex strips, vortex strakes and two different aft cavity devices. The firm claims 15% in fuel savings with the use of all their devices together.

Another leading company in the global freight fuel efficiency industry is the California-based firm, ATDynamics. This company got its start in 2006, and is currently using an angled planar cavity device. ATD now markets the design as its TrailerTail®, claiming fuel savings of 5 to 6% for tractor trailers traveling at highway speeds. Engineers at ATDynamics have revised the base design so that it now is easily collapsible to still allow full usage of the doors. According to the company's website, the device can be retrofitted to any swing door trailer, and in early 2009, another design will be released for roll-door trailers.

The reduction in drag associated with tractor-trailers has been the subject of numerous investigations throughout years. Initially, frontal drag was only considered, from the standpoint of changing the shape of the cab. In the early 1970's NASA carried out an extensive investigation into the concept of drag in tractor trailers. In their experiments, researchers modified the flow over the front of the truck. They concluded that with the aid of commercial aerodynamic devices, the fore drag could be reduced by up to 24 percent. This was associated with a reduction of the coefficient of drag, $C_D$, from 1.17 to 0.89. Many more studies throughout the years were carried out to focus on forebody modifications to reduce drag. At that time, the largest drag reductions were available by changing the forebody flow field through the addition of fairings and other flow modifiers.

Research into aft related drag closely followed all of the forebody drag reduction studies. One of the most heavily cited research studies about add-on devices to reduce the aft drag was carried out by Mason and Beebe (1978), in an investigation into flow field characteristics of trucks and buses sponsored by General Motors (see Mason, Jr., W. T., and P. S. Beebe. "The Drag Related Flow Field Characteristics of Trucks and Buses." *Aerodynamic Drag Mechanisms of Bluff Bodies and Road Vehicles*. General Motors Research Laboratories, 1978. pp. 45-93). In their work, they investigated the major drag producing regions and detailed characteristics of each of them. Their research is one of the most complete and highly detailed studies of tractor trailer drag. Most notably, Mason and Beebe investigated the potential of increasing base pressure through aft-mounted devices. Many different aft device configurations were studied, including horizontal and vertical splitter plates, non-ventilated cavities, and even guide vanes. All drag reduction concepts were aimed at lowering the base pressure of the trailer, thus reducing the impact of turbulent air shed off the rear of the trailers and the associated drag. Mason and Beebe maintained that an effective design must serve two important purposes: the pressure gradient must be minimized and the large streamline separation associated with moving bluff bodies must be prevented.

At Clarkson University, there have been multiple undergraduate and graduate students who have researched aft reduction devices. The first notable study was done by J. D. Coon (2001), who investigated the effects of a wide variety of unventilated cavity devices on drag. Coon conducted a full experimental and numerical study to examine both the effectiveness and the feasibility of drag reduction using these devices on the aft face of tractor-trailers. By varying the geometric parameters of plate-cavity designs, like plate length and plate inset, an optimum range was found. The performance of the proposed drag reduction devices was evaluated using a 1:15.25 scale model of a Peterbilt 379 tractor and 48 foot trailer. Coon also used a numerical simulation to look at the flow field, and this indicated that the simulation supported that the designs effectively lowered the base pressure of the model. Additionally, he constructed a full-scale prototype of his best performing device and performed several on-road tests. The results of his scale model drag increments obtained in the Clarkson University subsonic wind tunnel were promising, and indicated a drag reduction of up to 9% of the isolated trailer drag.

Dave Maragno (2003) continued to investigate geometric manipulation of the rear of tractor trailers, attempting to narrow the wake region and reduce drag. Maragno specifically focused his research on discovering what the optimal geometries and configurations of planar cavity drag reduction devices. Plate-cavity devices were examined, due to their success in Coon's research, as well as the practicality and ease of use in industrial and commercial settings. In his work, Maragno recognized the success of Coon's planar cavities, but cited explicitly how designs like this become less effective with increasing yaw angles. He investigated angling the planar sides inward to reduce drag more effectively over a larger range of yaw angles. Additionally, Maragno sought to determine which angled plate geometry produces the largest reduction in drag for typical highway conditions. Maragno took into account dozens of geometries and combinations of factors, including the inset distance, angular insets and deflections, side length and top and bottom plate removals, even the addition of splitters. A total of twenty-six designs are fully detailed and assessed for a range yaw angles in his report. The results indicated that angled plates are more effective at reducing drag than previous designs. At zero degrees yaw, Maragno obtained results with maximum $\Delta C_D$ values of around 0.12. This value was nearly double the $\Delta C_D$ value of 0.07 that Coon had observed at zero degrees yaw in his best performing device, the 4 foot inset plate-cavity device.

In 2007, Kevin Grover evaluated and optimized these sealed aft cavities for use on full size Class 8 tractor trailers. Through full scale testing, he observed drag reduction results similar to Maragno. Grover maintained that the sealed aft cavity geometry provided the best performance, with a 15 degree inward angular deflection on the side and top panels and a 7 degree inward angular deflection on the bottom panel. The scope of his research mostly focused on the fuel savings numbers associated with the previously mentioned drag reduction devices. His results indicated an optimal savings of 0.6 mpg for a four-sided planar configuration. Based on a nominal fuel economy for a tractor trailer of approximately 7 miles per gallon, this represents an 8.5% savings.

Guide vanes have been studied as an alternative to reducing drag in bluff bodies. The oldest published research found regarding vaned devices aimed to reduce aft drag is referenced in Mason and Beebe's draft reduction studies. This is the wind tunnel investigation of Frey (1933). His research was one of the first studies into reduction of pressure drag by a means of guide vanes. Frey used a simple bluff body which had a span of 500 mm and was tested between non-metric end plates, 1.3 m long×1.0 m wide. He treated this body simply as a two dimensional shape. The effects of adding two staggered guide vanes on the body's trailing corners were investigated. These guide vanes were found to have a dramatic difference on the body's $C_D$. By adding the vanes, a 50% reduction in the body's $C_D$ was reported.

In a more recent investigation, as a part of a larger drag reduction study, Mason and Beebe tested the drag reduction characteristics of guide vanes applied to a tractor trailer. Using Frey's results as a motivation, Mason and Beebe also explored the practical potential of using guide vanes. Mason stated that the hope for the vaned device was that the vanes would direct air flow inward, towards the low pressure area behind the trailer, thus significantly reducing the trailer's wake size and drag.

In their results, however, Mason and Beebe actually found that the guide vanes had an adverse effect on drag: creating more, rather than reducing it. They suggested that the dramatic results of Frey do not appear transferable to three-dimensional bodies in ground proximity. They then cited similar results from two other studies: Sherwood (1953) and Kirsh, Garg & Bettes (1973). In their findings, the only device that they found to reduce drag was the non-ventilated cavity design yielding a drag reduction of about 5%. Because of the failure to obtain positive drag-reducing results with the guide vanes, the option has always been mostly ignored as a viable option.

A recent paper published by the Japanese Society of Mechanical Engineers was found, it reopened the possibility of using a guide vaned device to lower aft drag in tractor trailers. In 1986, Kato, Fujimoto and Watanabe three Japanese mechanical engineers, published a paper entitled, "Form Drag Reduction of a Bluff-Based Body with the Aid of Thin Circular-Arc Vanes". In their investigation, Kato et al attempted to control the wake and reduce drag with the aid of thin circular-arc guide vanes, installed at the base corners. Findings indicated a drag coefficient decrease of about 25%, a decrease even larger than those obtained by using non-ventilated cavity devices. In addition to these positive results, the paper contained an optimum configuration of vanes as a ratio between the bluff body width, its boundary layer thickness and its displacement thickness.

Because Kato's guide vane investigation produced such promising results, there arose reason to believe that these vanes could reduce drag just as dramatically for a tractor trailer bluff body model. Ultimately, the Kato study served as the largest motivation and guideline for the arc shaped guide vanes tested for this investigation. The study's optimum geometries worked well for Kato's bluff body, but dimensions had to be found for a tractor trailer case. Kato's dimensions could've been simply scaled to the Clarkson wind tunnel model, but most likely would not be optimized for maximum drag reduction. Due to the numerous geometric variable dimensions involved with the guide vane placement, a computational fluid dynamic study was conducted first. The CFD study, outlined in the next chapter, was directed toward finding the best geometric placement of guide vanes.

Description of the Related Art Section Disclaimer: To the extent that specific patents/publications/products are discussed above in this Description of the Related Art Section or elsewhere in this Application, these discussions should not be taken as an admission that the discussed patents/publications are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications are discussed above in this Description of the Related Art Section and/or throughout the application, they are all hereby incorporated by reference into this document in their respective entirety (ies).

SUMMARY OF THE INVENTION

The present invention recognizes that there are potential problems and/or disadvantages that must be faced and solved with respect to conventional devices used to reduce vehicle aerodynamic drag. While designs like TrailerTails®, for example, are finally becoming accessible to trucking firms, there is still a large degree of inconvenience involved in extending and collapsing the device on the back of the truck (where, for example, a truck driver has to fold and unfold the aerodynamic device). Additionally, the current boat-tail and planar cavity designs are bulky, and can be heavy. Various embodiments of the present invention may be advantageous in that they may solve or reduce one or more of the potential problems and/or disadvantages discussed in this paragraph and elsewhere in this specification.

Various embodiments of the present invention may exhibit one or more of the following objects, features and/or advantages:

It is therefore a principal object and an advantage of the present invention to provide a modular vaned design that can be an easy, one-time installation without ever having to expand or collapse the device. With this design, a truck driver's job can be made even easier since once the device is installed, no other manipulation is needed on his/her part.

It is another object and advantage of the present invention to provide a modular vaned design or guide vane system that can require roughly a third of the material that prior designs need. Reduced weight and simplicity most often translates into lower costs, and ease of manufacturability. A simpler vaned design as provided herein, can be just as effective as any other aft drag reduction designs, and can be very beneficial and easily marketable (e.g., fixed guide vanes of a much smaller size than current cavity devices).

In accordance with the above-referenced objects and advantages, an embodiment of the present invention is directed to a vehicle having an apparatus for reducing aerodynamic drag including, but not limited to: a vehicle having a front side, and an aft side located in a first plane with an aft perimeter, wherein the aft perimeter includes a first vertical surface, a second vertical surface, a first horizontal surface and a second horizontal surface; a guide vane with an airfoil cross-section having a leading edge and a trailing edge, wherein: the leading edge is bulbous and tapers to the trailing edge, the guide vane is mounted around and to the aft perimeter along a portion of at least one of the first vertical surface, the second vertical surface, the first horizontal surface and the second horizontal surface; and the leading edge faces and extends in a direction toward the front side beyond the first plane.

As further described in the Detailed Description Section below, the discovery that blunt body drag can be dramatically reduced using vanes has the potential to be revolutionary for tractor trailer aerodynamics. Also, all the referenced Clarkson studies serve as good precedents for how to go about investigating guide vanes as drag reduction devices. Building on this strong foundation of prior research at Clarkson, embodiments of the present invention seek to go in a slightly different direction with aft drag reduction devices. While previous research has focused on planar cavity concepts, there has been no venture into investigating how guide vanes may reduce drag (especially in tractor trailers). Using the wind tunnel techniques and background that these previous studies have provided, the current specification focuses specifically on guide vanes as an alternative form of drag reduction and their full size usability.

BRIEF DESCRIPTION OF THE DRAWINGS

The present invention will be more fully understood and appreciated by reading the following Detailed Description in conjunction with the accompanying drawings, in which:

FIG. 1a-b is illustrate two mesh cases for bluff body models, baseline and open cavity, respectively, according to an embodiment of the present invention.

FIG. 2a-b is an illustration of the aft sections of each mesh model, according to an embodiment of the present invention.

FIG. 3a-b shows velocity contour plots at highway speeds, according to an embodiment of the present invention.

FIG. 4 shows total pressure contour plots at highway speeds, according to an embodiment of the present invention.

FIG. 5 shows flow visualization according to the velocity contour plot, according to an embodiment of the present invention.

FIG. 6 shows a tractor trailer model in a wind tunnel, according to an embodiment of the present invention.

FIG. 7 shows a Flintec PC42 10 kg Load Cell used in experiments described herein.

FIG. 8 shows a force balance set-up used in experiments described herein.

FIG. 9 shows a data acquisition board used in experiments described herein.

FIG. 10 shows a calibration device used in experiments described herein.

FIG. 11 shows a plot of the relation of the output voltage versus the applied weight, according to an embodiment of the present invention.

FIG. 12 shows a digital pressure gauge used in experiments described herein.

FIG. 13 shows a pressure transducer calibration curve, according to an embodiment of the present invention.

FIG. 14 shows a side and drag force schematic.

FIG. 15 shows a Kato experimental set-up.

FIG. 16A-C shows initial vaned design model configurations, according to an embodiment of the present invention.

FIG. 17 is a graphical representation of the effects of yaw angle on drag reduction, according to an embodiment of the present invention.

FIG. 18 is a graphical representation of Maragno's yaw angle results.

FIG. 19 is a graphical representation of the 158R vaned configurations, according to an embodiment of the present invention.

FIG. 20 is a graphical representation showing a performance comparison of vaned configurations on the basis of drag reduction percentage, according to an embodiment of the present invention.

FIG. 21A-B shows a comparison of 124R-62C and 158R-79C vanes, according to an embodiment of the present invention.

FIG. 22 shows the Kato geometry set-up with vanes and a back plate, according to an embodiment of the present invention.

FIG. 23 shows an airfoil vane geometry, according to an embodiment of the present invention.

FIG. 24 shows an airfoil vane concept on a model tractor trailer, according to an embodiment of the present invention.

FIG. 25 shows a close-up of a vane offset and set screw assembly, according to an embodiment of the present invention.

FIG. 26 shows an offset dimension, according to an embodiment of the present invention.

FIG. 27a-b shows sealed cavity improvised designs, according to an embodiment of the present invention.

FIG. 28 is a graphical illustration showing offset effects on drag reduction, according to an embodiment of the present invention.

FIG. 29 is a graphical illustration showing the final yaw angle investigation results, according to an embodiment of the present invention.

FIG. 30 is a graphical illustration showing the initial yaw angle study results, according to an embodiment of the present invention.

FIG. 31 is a graphical illustration showing the airfoil vane design zero degree yaw results, according to an embodiment of the present invention.

FIG. 32 is a graphical illustration showing the airfoil vane drag reduction percentage results, according to an embodiment of the present invention.

FIG. 33 is a graphical representation showing an overview of devices tested on the basis of delta Cd, according to an embodiment of the present invention.

FIG. 34 is a graphical representation showing an overview of devices tested on the basis of drag reduction percentage, according to an embodiment of the present invention.

DETAILED DESCRIPTION

The present invention will be more fully understood and appreciated by reading the following Detailed Description in conjunction with the accompanying drawings, wherein like reference numerals (if any) refer to like components.

Definitions

Each symbol etc. on the left hand side of the Table 1 below and used herein shall have the meaning listed in the right hand column, respectively.

TABLE 1

| Symbol | Definition |
| --- | --- |
| A | Projected frontal area |
| $A_c$ | Area contraction factor of wind tunnel |
| $A_f$ | Frontal area of vehicle |
| B | Kato notation for body width |
| C | Kato notation for guide vane arc length |
| $C_D$ | Coefficient of drag |
| $C_{Dbase}$ | Reference drag coefficient |
| $\Delta C_D$ | Reduction in coefficient of drag |
| D | Drag force |
| $D_T$ | Drag measured by drag force load cell |
| $D_D$ | Component of drag measured from drag load cell that contributes to overall vehicle drag |
| $D_{SF}$ | Component of overall drag that is measured by the side force load cell |
| F | Force due to pressure |
| P or $P_{total}$ | Atmospheric pressure |
| $\Delta P$ | Differential pressure |
| q | Dynamic Pressure |
| R | Universal gas constant |
| xxxR | Kato notation for guide vane radius of xxx |
| Re | Reynolds number, found by the following Equation: $$Re = \frac{\rho Vw}{u}$$ |
| S | Kato notation for guide vane offset |
| $SF_T$ | Side force measured by balance |
| T | Temperature |
| $U_x$ | Uncertainty of quantity x |
| V | Velocity |
| W | Bluff body width |
| $\rho$ | Density of air |
| $\Psi$ | Yaw angle |

The aerodynamic flow behind a tractor trailer is characterized by swirling vortices, turbulence and a low pressure region. This wake following the trailer is one of the leading causes of aerodynamic drag that tractor trailers experience. In accordance with an embodiment of the present invention, it is shown that it is possible to change the aft geometry of trailers in an effort to minimize the pressure gradient, streamline separation and the associated drag. In the past, as noted above, geometric manipulation of the trailer has focused on the use of plate-cavity devices to narrow the wake region and reduce drag. In the present specification, the concept of guide vanes to reduce drag is examined, due to their potential to simplify manufacture and implementation on full scale trailer applications.

In accordance with an embodiment of the present invention and as set forth herein, experiments have been conducted to examine the effectiveness, feasibility, and practicality of drag reduction using two different vaned device concepts. Yaw angle, vane configuration and vane offset were all varied during the wind tunnel testing. The drag reduction devices were tested in the Clarkson University high speed wind tunnel using a 1:15.25 scale model of a Peterbilt 379 tractor and 48 foot trailer. A force balance was used to measure the side and drag forces acting on the wind tunnel model.

In brief, the results indicated that the circular arc vanes tested were not the most effective way to reduce drag. Offsetting the guide vanes from the truck surface did not reduce drag. Instead, these devices were most effective with zero offsets. Additional configuration studies suggested that devices with just side vanes were just as effective as devices with vanes around the entire perimeter of the aft end. A vaned design that features an airfoil cross-section was also evaluated, and showed promising results. An average drag coefficient reduction of $\Delta C_D = 0.048$ was observed for the airfoil vaned device.

As described in the Background section, Because Kato's guide vane investigation produced such promising results, there arose reason to believe that these vanes could reduce drag just as dramatically for a tractor trailer bluff body model. Ultimately, the Kato study served as the largest motivation and guideline for the arc shaped guide vanes tested for this investigation. The study's optimum geometries worked well for Kato's bluff body, but dimensions had to be found for a tractor trailer case. Kato's dimensions could've been simply scaled to the Clarkson wind tunnel model, but most likely would not be optimized for maximum drag reduction. Due to the numerous geometric variable dimensions involved with the guide vane placement, a computational fluid dynamic study was conducted first. The CFD study, outlined in the Examples section below, was directed toward finding the best geometric placement of guide vanes.

Advantages of the invention are illustrated by the following Examples. However, the particular materials and amounts thereof recited in these examples, as well as other conditions and details, are to be interpreted to apply broadly in the art and should not be construed to unduly restrict or limit the invention in any way.

EXAMPLES

Example 1

Computational Fluid Dynamic Analysis

This Example sets forth a description of the computational fluid dynamic (CFD") analysis used to investigate the potential of drag reduction with arc-shaped vanes. Using the data from the initial wind tunnel testing in Japan as a starting point, a comprehensive CFD optimization study was initiated. The purpose of this study was to use relationships between boundary layer formation, thickness and the geometry of the vanes to ultimately find out the optimal geometry of the vanes. In this way, through continually optimizing the computer model, a good correlation between model geometry and drag reduction could be obtained.

Before getting into detailed quantitative studies on arc vanes, the CFD study began with very general qualitative studies. The first of these studies was the two dimensional modeling of a simple bluff body, the length and width of a tractor trailer both with and without a drag reducing device. The bluff body was modeled from the top view. The device that was used in the model was Dave Maragno's planar cavity design, since it was not only effective in reducing drag, but also had the easiest geometry to quickly model. The geometry and mesh were created in Gambit, and then imported into Fluent to solve. For this model, a 2-D tri pave mesh was used, with an edge line mesh of 32 nodes on every edge. In this way, the mesh was very concentrated at the front and back of the bluff body, and much rougher near the outer edge of the modeled flow area. The entire flow area was modeled to have a height fifteen times the truck width, and it extended in front of and behind the truck a distance of ten times the truck width. Some other mesh set-ups were experimented with, including a square mesh constructed using a subtractive process, but the tri pave mesh was most efficient and showed the best results.

FIGS. 1a, and 1b, illustrate the two mesh cases, baseline and open cavity. The comparison shows how much denser the mesh is around the aft end with the open cavity device included. A close up of the aft section of each mesh model is shown separately in FIG. 2a-b.

For each case, a simulation was run with a free-stream velocity of 37 m/s, the approximate experimental wind tunnel speed. Since the modeled bluff body was the same dimensions as the wind tunnel model, the width based Reynolds number can be taken as equal to the wind tunnel testing Reynolds number. The bluff body was treated as a stationary wall, with the left edge of the mesh considered the only velocity inlet and the right edge as the outlet. The pressure at both the inlet and outlet was considered atmospheric. Finally, the top and bottom mesh boundaries were treated as moving walls at the free stream velocity. They were set up this way to prevent a large boundary layer build-up on either side of the mesh. In Fluent, the simulation was solved using first a laminar model and then a k-epsilon turbulent model solution. The model was iterated three different times, at an increasing number of iterations, with convergence criteria of 1 e-5 for all parameters. However, due to the oscillatory nature of the flow, convergence was never reached. For a qualitative visualization of the flow, FIGS. 3 and 4 show a comparison of the velocity and total pressure contour plots for each turbulent case. The calculated values cannot be taken as accurate, due to the oscillatory nature of the flow, but the plots illustrate the nature of the flow. For accurate values of velocity, pressure or drag, it is required to average the values over a time interval.

In the velocity contour plot, the low velocity area at the base of the body is smaller in the open cavity model. With the addition of a planar cavity, the 'cone' of low velocity air behind the bluff body is distinctly narrowed. Additionally, FIG. 4 illustrates the smaller low pressure zone in the open cavity model. Both characteristics suggest a more streamlined flow, with less flow separation. In most qualitative respects, it seems that Fluent correctly models this flow condition.

While the CFD flow visualization showed a good flow model, a force report for these two cases, produced results that called into question this simulation's accuracy. The results are presented below in Table 2. According to the results from Fluent, the drag forces were shown to increase, not decrease in the case which included the device. These results run contrary to what has been observed in wind tunnel and full sized tests. This severely discounts the accuracy of this analysis. One possibility is that this discrepancy is caused by the oscillatory nature of the flow. The reported drag forces may have been more accurately represented if time averaged values could be found, but this is not guaranteed. There is another disagreement with experimental results. The drag forces that Fluent reported are about double the highest drag forces recorded during wind tunnel testing. The total drag coefficients also show values that are much higher than any experimental coefficient. The CFD model was set-up with all the same wind tunnel conditions, yet the calculated drag forces are nowhere near experimental values. If any other difficulties were encountered that were reason to question this analysis, this proved to be the biggest one.

TABLE 2

Reported Drag Forces

|  | pressure force [N} | viscous force [N] | total force [N] | pressure coefficient | viscous coefficient | total coefficient |
|---|---|---|---|---|---|---|
| No Device | 91.52098 | 7.48525 | 99.006231 | 149.42201 | 12.220816 | 161.64283 |
| With Device | 104.7054 | 9.464854 | 114.17021 | 170.94753 | 15.452823 | 186.40035 |

The final study that was attempted in the CFD analysis was an investigation to determine if an inviscid solution would yield better results than the k-epsilon solution did. In this analysis, the fact that the flow model of this case was an oscillatory flow became evident through the flow visualization. Using the same boundary conditions and free stream velocity of 37 m/s, only the baseline bluff body was simulated. The simulation was run first at 1000 iterations, then again at 2000 and 3000, to determine how much the values vary. The flow visualization according to the velocity contour plot in FIG. 5 was very interesting. An inviscid solution results in a picture of a tractor trailer's shedding wake and its oscillatory nature. This shedding wake was not seen in the previous k-epsilon flow model solutions.

In FIG. 5, it becomes evident that the body has an oscillating wake. The integrated force results also indicate that the forces are rising and falling with increasing iterations, due to the oscillatory nature. Table 3 illustrates the simulation's results. It suggests that due to the oscillatory nature, the pressure and viscous forces will continue to oscillate around 1.3 and 1.4 Newtons. (Note that the forces are much smaller than the forces found in the previous study, due to the difference in solution models.)

TABLE 3

Oscillatory Nature of Flow

| Iterations | pressure force [N} | viscous force | total force [N] | pressure coefficient | viscous coefficient | total coefficient |
|---|---|---|---|---|---|---|
| 1000 | 1.386435 | 0 | 1.386435 | 2.2635674 | 0 | 2.2635674 |
| 2000 | 1.481357 | 0 | 1.4813573 | 2.4185426 | 0 | 2.4185426 |
| 3000 | 1.339852 | 0 | 1.3398522 | 2.1875138 | 0 | 2.1875138 |

After determining the presence of an oscillating flow field in the simulations, this part of the research was suspended. Perhaps better drag values could be found using a time-averaged solution method. In the wind tunnel, time averaged values are used to compensate for the oscillatory nature of the flow. But even if the values were time valued, it was hard to tell if the programs values could be trusted. Results that suggested that drag increased with the addition of a planar cavity device discount the reliability of this model. In addition to this discrepancy, drag forces were much higher than any found in experimental testing, suggesting that there may be other problems with the model and solution method. It was decided that time could be better spent doing more experimental analysis (described below). Although this part of the research was very time-consuming, and did not appear to yield many useful results, it went a long way towards illustrating just how complex the flow is in a tractor trailer traveling at highway speeds.

Example 2

Experimental Apparatus

This Example describes the experimental apparatus used in the following Examples. All wind tunnel testing was conducted in the Clarkson University high speed Eiffel type wind tunnel on a 1:15.25 scale tractor trailer model. The biaxial force balance set-up was taken directly from J. D. Coon's thesis work (see "SAE Wind Tunnel Test Procedure for Trucks and Buses." SAE International. 1981), as very little is changed from his original set-up.

During testing, the maximum velocity achieved by the wind tunnel was approximately 37 m/s, or 82.8 mph. Based on trailer width, the Reynolds number produced by this velocity is about $3.9\times10^5$. If it is assumed that a full scale tractor trailer experiences an average wind speed of 70 mph, or 31.3 m/s, and that the usual width of a tractor trailer is 2.46 meters, the resulting full scale Reynolds number is approximately $5\times10^6$. The SAE Wind Tunnel Test Procedure for Trucks and Buses' suggests a minimum experimental Reynolds number of $0.7\times10^6$, which is above the values seen with the current wind tunnel setup. Since the Reynolds number conditions set forth by the SAE Wind Tunnel Test Procedure are not satisfied, the drag measured in the tunnel may not be considered equivalent to the drag on a full scale vehicle at the same velocity. However, the wind tunnel results can be quite useful when the results are assessed on the basis of changes in drag. They can then be just as relevant as numbers at full scale or at a scaled Reynolds number. This drag increments method has been used by all previous research at Clarkson, as well as in Mason and Beebe's investigations (see Mason, Jr., W. T., and P. S. Beebe. "The Drag Related Flow Field Characteristics of Trucks and Buses." *Aerodynamic Drag Mechanisms of Bluff Bodies and Road Vehicles*. General Motors Research Laboratories, 1978. pp. 45-93).

Tractor Trailer Model

The wind tunnel scale tractor trailer model used in this study was the same one previously constructed by J. D. Coon. The cab is modeled after a Peterbilt Model 379 tractor, with a trailer modeled after a standard full-scale 48 foot (14.6 m) trailer. The actual total length of the model was 51.35 inches (1.3 m). This measurement includes the trailer, which extends 37.75 inches (0.96 m) and the cab, which measures approximately 11.1 inches (0.064 m). The projected frontal area of the tractor trailer model was approximately 61.7 in.$^2$ (398.1 cm$^2$), with a side cross-sectional area of 372.6 in.$^2$, as calculated by Coon. The width-based Reynolds number for the experiment was approximately $3.9\times10^5$. FIG. 6 shows the model fully set up in the tunnel.

The cab was made of carved foam, covered in Bondo auto body filler, and then painted. It was connected rigidly to the trailer by a wooden beam, approximately 2 in. by 4 in. The trailer is constructed largely of plywood. The gap between the tractor and trailer is 2.5 inches long (0.064 m), which translates to approximately 38 inches (0.97 m) in the full scale. There are eighteen model wheels included, but they were all immobile for the experiments. Undercarriage details and protrusions have been represented as closely to the real thing, while still staying simple. Since Coon and Maragno have used the model, some small modifications have occurred. The trailer tandem axle mounting block has been modified from a block of wood to an aluminum c-channel. This was done in hopes of getting a more realistic airflow around the rear axles.

A 0.75 inch diameter steel mounting sting was attached to the undercarriage of the model at its center of gravity, which was determined by finding the balancing point of the model. The model is secured to the sting with a machined collar, with two hex key eye screws. When mounting the tractor trailer in the tunnel, care must be taken to make sure the model is level in both the drag and side force directions. This was accomplished with the aid of a small laser level. In preparation for tests, three small mounting holes were drilled in the top of the trailer, to set the laser level into. In this way, the model is located the same way every time it is put back into the tunnel. The location of the mounting sting on the trailer model minimizes bending moment contributions of the model on measured drag data.

Data Acquisition

A biaxial force balance was used to take measurements on the tractor-trailer model in the wind tunnel. Drag and side forces data was acquired in the same way as in Dave Maragno's previous wind tunnel experiments. As a result, much of this section is taken from his thesis (see Maragno, D. & Visser, K. D. (2003) "The Effects of Aft Cavity Inset and Boat Tail Angle on Drag Reduction of Tractor Trailers," Report No. MAE-365, Department of Mechanical and Aeronautical Engineering, Clarkson University). The reader is referenced to his work for full details, but a pertinent excerpt is shown below.

Side force and drag measurements are recorded through use of an in-house customized force balance system. The force balance is a system which sits below the wind tunnel test section and consists of two nearly frictionless IKO International linear translators with crossed roller bearings, allowing for two degrees of freedom in horizontal directions. Rising from these translators and into the wind tunnel test section is a sting on which the trailer model rests. Any drag forces that the model may experience cause the model to displace along with the attached translators. Resting against the translators via customized brackets are two aluminum Flintec PC42 10 kg limit load cells which act as cantilevered beams. The instrument error for the load cells was 0.02% of the applied load. The Flintec load cell can be seen below in FIG. 7. When a force flexes the load cells, a built-in electronic strain gauge is used to measure forces applied to it. The force causes a change in the electrical resistance of the cells, which thus changes the voltage outputted by them. To interpret the voltage changes into useable forces, a program was written in LabVIEW. The resulting drag measurements recorded by LabVIEW are based on input calibration coefficients. The calibration procedure is described separately in the "Force Balance Calibration" section below. A force balance set-up is shown in FIG. 8

Data Acquisition Card

A National Instruments data acquisition board, illustrated in FIG. 9, was used to communicate the voltage outputs of the load cells and the three other transducers described above to Systemax CPU in the lab. The unit operated on a 1.8 GHz Pentium 4 processor with 512 MB of RAM. The computer was equipped with a National Instruments data acquisition card model PCI-6024E.

Force Balance Calibration

Prior to every set of data collected, a calibration process was performed. The process was a simple procedure which involved loading the force balance along the side force and drag directions by a set of known weights and determining the linear relationship between the applied loads and the outputted voltage reading. The weight-application mechanism constructed by Maragno is shown in FIG. 10.

A set of weights applied to an inelastic string through a pair of assumed frictionless pulleys which is set to pull against the force balance in the side force direction. This procedure is repeated for the drag direction of the force balance as well.

A relation of the output voltage versus the applied weight was determined and is plotted in FIG. 11, with the equation of the line having the form V=A*W+B. The coefficients A and B are calibration coefficients input into LabVIEW to translate voltage measurements into force values. In the FIG. 11 plot, the equation of the line is provided in the upper right corner. In this case, the calibration coefficients are A=375.8 and B=−0.1472.

Pressure Transducer Calibration

During the final testing phase, it was necessary to calibrate a pressure transducer. This was done in a similar way that any other transducer would be calibrated. The voltage outputs of the transducer at different tunnel velocities were compared with the pressure differential readings measured by the Mensor Series 2500 Digital Pressure Gauge (FIG. 12). For this procedure, the pitot tubes were first connected to the Omega 10" pressure transducer and the tunnel was run at several speeds. The voltage readings were recorded in a spreadsheet for later use. Then the pitot tubes were connected to the Mensor gauge. The tunnel was again run at the same speeds as before. The pressure differential readings were recorded for each speed in the same spreadsheet as the voltage readings. Finally, the results were plotted in the form of P=A*V+B. Over the curve, a best fit line was plotted. The calibration coefficients A and B were then calculated using the equation of the line. FIG. 13 shows a sample calibration curve with the line equation.

Wind Tunnel Operation

After all calibration is complete, and the tractor trailer model is secured to the sting at the desired yaw angle, the wind tunnel can be operated. "Wind-off" values are taken first, to determine if all values for the wind tunnel pressure differential, tunnel velocity and both drag and yaw forces are zero, as they should be. Often, due to factors like calibration approximations, environmental conditions, external vibrations and instrumental white noise, these values are not exactly zero. There was a small degree of drift in the values, especially the tunnel velocity values. To remedy this, the tunnel-off values were used as offsets for the data, and the calibration intercepts were corrected using these offsets.

After initial "wind-off" values, test running could commence. A base test run was first taken, with no device attached. For most tests, a test run was then taken using Maragno's optimized design. In this way, each geometry had both a baseline with no device and a comparison run with the max drag reduction device to compare to. Adding this "drag reduction baseline run" helped to provide evidence that the experiment was working properly at each yaw angle. After both the baselines were run, and the set-up was ensured to be working properly, the geometry being investigated was attached to collect a series of data at a particular yaw angle.

For each run, the wind tunnel is started up approximately 500 rpm, then slowly ramped up to the testing speed of 700 rpm. At scaled speeds, this is around common highway speeds of 70-75 mph. After each test run, the tunnel was then decelerated back to 500 rpm, and then shut off. It was necessary to allow the tunnel to completely come to a stop before changing the model set-up.

During all tests, data was collected using a LabVIEW program that was written mostly by Dave Maragno, and revised by Mark Czajkowski. Voltage readings for drag and side force go through a filter first, to largely eliminate high frequency readings. The code is designed so that once data collection is enabled during any test, 5120 voltage samples are read at a rate of 1024 Hz. The voltage readings are then sent through a low-pass $4^{th}$ order Butterworth filter with a cut-off frequency of 10 Hz to get rid of instrument noise. The data points are then averaged into a single data reading for drag and side force simultaneously, which ultimately yields a statistical average of forces acting on the truck. This process is then done forty times per point.

Throughout the testing process, factors like temperature, and barometric pressure were updated before every geometry tested, to ensure that the resultant forces, air density, wind velocity, $C_D$ and other calculations stayed as accurate as possible. The baseline test results were also closely monitored to ensure consistency. If any divergence was noted in the baseline drag forces, the system was recalibrated immediately. This recalibration did not occur often, but was necessary if the model was bumped or shifted on the sting while switching out the device.

Solution Method Overview

Using the experimental instrumentation described earlier, LabVIEW output values for drag and side forces [N], and pressure values [bar]. With various user inputs including room temperature [C], total pressure [mmHg], and truck dimensions [m], the program output calculated values for 11 different variables. Upon completion of each run, the code generated a text file with 11 columns for different parameters. In Table 3, an example is provided of the code output with each column labeled. Refer to the "Uncertainty Analysis" section below for an uncertainty analysis of all the data.

TABLE 3

| | | | | | | | | | | |
|---|---|---|---|---|---|---|---|---|---|---|
| Code Output and Units | | | | | | | | | | |
| Side Force | Drag | Tunnel Velocity | Pressure | Temperature | Density | Resultant Drag | $C_D$ | Reynolds # | Viscosity | Yaw Angle |
| N | N | [m/s] | [Pa] | [K] | [kg/m3] | [N] | — | — | [kg·m$^{-1}$·s$^{-1}$] | [deg] |

All side and drag force quantities reported by LabVIEW reflect the components of these forces acting in their respective directions on the biaxial force balance. For measurements taken at zero degrees yaw, these values correctly act on the truck model in the same directions as the load cells. However, for any non-zero yaw tests, the force balance components must be resolved along the side force and drag axes of the model. This becomes clear upon inspection of the schematic in FIG. 14 below.

The following was adapted from Maragno and Visser (see Maragno, D. & Visser, K. D. (2003) "The Effects of Aft Cavity Inset and Boat Tail Angle on Drag Reduction of Tractor Trailers," Report No. MAE-365, Department of Mechanical and Aeronautical Engineering, Clarkson University).

In FIG. 14, if flow is moving in the positive X direction, then the resulting side force on the vehicle is described by the SAE wind tunnel test manual (see Sherwood, A. W. (1953), "Wind Tunnel Test of Trailmobile Trailers," University of Maryland Wind Tunnel Report No. 85, June) as negative because it acts in the negative Y direction. Equations 1 and 2 describe how to resolve the measured balance forces onto the drag axis of the vehicle. The process may be adapted to determine forces acting along the side force axis of the vehicle; however drag is the primary concern of this study.

$$D_D = D_T \cos \psi \tag{1}$$

$$D_{SF} = -SF_T \sin \psi \tag{2}$$

In the above equations, $\psi$ is yaw angle, $D_D$ refers to the portion of drag acting in the drag load cell direction that contributes to the overall drag on the vehicle, and $D_{SF}$ refers to the portion of side force, as measured by the side force load cell, that contributes to the overall drag acting on the vehicle. The drag and side forces measured by the force balance are represented by $D_T$ and $SF_T$, respectively. As there are no other components to consider, the overall drag acting on the vehicle is the sum of equations 1 and 2, or:

$$D = D_T \cos \psi - SF_T \sin \psi \tag{3}$$

Finally, the coefficient of drag is determined with following drag equation:

$$D = \frac{1}{2} C_D \rho V^2 A_f \tag{4}$$

Because the drag force was resolved along the longitudinal axis of the vehicle, the area referred to in Equation 4 is the frontal area of the vehicle only. The tractor trailer model has a frontal area of approximately 0.040 m².

An uncertainty analysis of all data was applied and can be found in the "Uncertainty Analysis" section below.

Uncertainty Analysis

The following analysis is adapted from Coon and Visser (see Coon, J. D, and Visser, K. D. "Drag Reduction of a Tractor-Trailer Using Planar Boat Tail Plates," *The Aerodynamics of Heavy Vehicles: Trucks, Buses, and Trains, Lecture Notes in Applied and Computational Mechanics*. Ed. McCallen, R., Browand, F., Ross, J. Springer, 2004. pp. 249-265).

Recall that drag reduction was reported in terms of $\Delta C_D$, given as:

$$\Delta C_D = C_{D_{baseline}} - C_{D_{device}} \tag{1}$$

Then the associated uncertainty is:

$$U_{\Delta C_D} = \sqrt{\left(\frac{\partial \Delta C_D}{\partial \Delta C_{D_{base}}} * U_{C_{D_{base}}}\right)^2 + \left(\frac{\partial \Delta C_D}{\partial \Delta C_{D_{device}}} * U_{C_{D_{device}}}\right)^2} = \tag{2}$$

$$\sqrt{U_{C_{D_{base}}}^2 + U_{C_{D_{device}}}^2}$$

Assuming that $U_{CDbase} = U_{CDdevice} = U_{Cd}$ $$U_{\Delta C_D} = \sqrt{2} * U_{C_D}$$

Solving equation 2 requires the uncertainty for the drag coefficient. The drag coefficient is given by:

$$C_D = \frac{D}{qA} \tag{3}$$

where the dynamic pressure q is calculated from measured quantities according to equation 4:

$$q = \frac{1}{2} \rho V^2 = \frac{1}{2} \rho \left(\frac{2R(T+273)\Delta P}{P}\right) \tag{4}$$

The uncertainty of the drag coefficient, by Equation 3, is as follows:

$$U_{\Delta C_D} = \sqrt{\left(\frac{\partial C_D}{\partial D} * U_D\right)^2 + \left(\frac{\partial C_D}{\partial q} * U_q\right)^2 + \left(\frac{\partial C_D}{\partial A} U_A\right)^2} = \tag{5}$$

$$\sqrt{\frac{1}{q^2 A^2}\left(U_D^2 + \frac{D^2}{q^2} U_q^2 + \frac{D^2}{A^2} U_A^2\right)}$$

Equation 5 requires the uncertainty of the dynamic pressure, given by:

$$U_q = \sqrt{\left(\frac{\partial q}{\partial T} U_T\right)^2 + \left(\frac{\partial q}{\partial \Delta P} U_{\Delta P}\right)^2 + \left(\frac{\partial q}{\partial P} U_P\right)^2} \tag{6}$$

$$= \sqrt{\left(\frac{\rho R \Delta P}{P} U_T\right)^2 + \left(\frac{\rho R(T+273)}{P} U_{\Delta P}\right)^2 + \left(\frac{-\rho R(T+273)\Delta P}{P^2} U_P\right)^2}$$

Included directly below is a table of uncertainty values which will assist in solving equations 5 and 6. These uncertainty values are strictly based on instrument resolution.

TABLE 4

| Experimental Uncertainties |
| --- |
| $U_T$ = 0.5° C. |
| $U_{\Delta P}$ = 4.2148 Pa |
| $U_P$ = 9.9565 Pa |
| $U_A$ = 0.000226 m² |
| $U_D$ = 0.0002 * D = 0.007222N |

Considering the airfoil device's best performance, at zero yaw, equations 5 and 6 are solved. The device had an average drag force of 36.106 N.

$U_q$ = 4.45297 kg/ms²

$U_{CD}$ = 0.007768

Referring back to equation 2: $U_{\Delta CD}$ = 0.010986.

Example 3

Wind Tunnel Models

Initial Testing

This Example describes certain "initial testing" of the "wind tunnel models." The purpose of the initial testing was to simply get an idea for how Kato's un-optimized scaled geometry worked on the tractor trailer model. Because it was a preliminary testing step, only two studies were carried out: a yaw angle study on Kato's design, and a study that examined the change in drag reduction that different configurations cause. A description of testing that occurred during this phase is set forth herein.

Using the Kato et al investigation as a starting point, the initial, exploratory design was modeled using optimal dimensions from the paper. A schematic illustrated in FIG. 15 shows Kato's experimental set-up (see also Frey, K. (1933), "Verminderung des Stroemungswiderstandes von Koepern durch Leitflaechen," *Forschung Ing. Wesen,* March/April, pp. 67-74). The optimum configuration of vanes is given as ratios of the vane arc-radius to body width, vane arc length to body width and finally the vane offset to boundary layer thickness. Table 5 shows the simple chart of geometry configurations that Kato investigated. The radius, chord length and body width measurements that the table references can seen on FIG. 15.

TABLE 5

Kato's Optimum Arc Configurations (adapted from Kato11)
Optimized Geometries

| Symbol | R (mm) | R/B | C (mm) | C/B |
|---|---|---|---|---|
| 70R-35C | 70 | 1.00 | 35 | 0.50 |
| 70R-28C | 70 | 1.00 | 28 | 0.40 |
| 55R-35C | 55 | 0.79 | 35 | 0.50 |
| 55R-28C | 55 | 0.79 | 28 | 0.50 |
| 35R-35C | 35 | 0.50 | 35 | 0.50 |
| 35R-28C | 35 | 0.50 | 28 | 0.40 |

R: radius of curvature
C: chord length
B: body width

The goal of the initial testing was to see quickly if a circular arc vane design showed any promise of reducing drag. Therefore, the method of obtaining the model device was fairly simple. Using Kato's two best optimized cases, the dimensions were then scaled up to Clarkson's wind tunnel model truck, keeping the ratios between fundamental dimensions the same. Table 6 contains the dimensions of the two best performing optimized Kato geometries, and their complementary dimensions for the wind tunnel model. Using the most efficient Kato design, the 158R geometry, a prototype was fabricated on the stereolithography machine. The prototype, with a vane around the entire perimeter of the aft face can be seen in FIG. 16, Panel A. This configuration, with vanes on the top, bottom and sides will be referred to as the 'full halo configuration' for the remainder of this specification. Note that testing was conducted with the bottom panel of the device sealed.

TABLE 6

Kato Dimensions Scaled to Clarkson's Model

| | | R [mm] | R/B | C [mm] | C/B | S/B | S [mm] |
|---|---|---|---|---|---|---|---|
| Kato Geometry | 70R-35C | 70 | 1 | 35 | 0.5 | 0.03 | 2.1 |
| | 55R-28C | 65 | 0.79 | 28 | 0.5 | 0.07 | 4.87 |
| Clarkson Geometry | 158R-79C | 158 | 1 | 79 | 0.5 | 0.03 | 4.74 |
| | 124R-62C | 124 | 0.79 | 62 | 0.5 | 0.07 | 11.06 |

During the testing, the focus was also on finding any trends or connections involved with removing the top and sides of the device. Testing was first carried out for the full halo: top, bottom and sides. This halo design was extensively tested, including investigations of different wind speeds and the impact of yaw angles. The configuration was then tested at a range of yaw angles, from −9° to +9° at intervals of 3°. Each time, the design was run against a baseline run of the tractor trailer with no device attached to the back. Each run was also compared to a test run with Maragno's optimized planar cavity design. Details on the operation of the wind tunnel can be found in the "Wind Tunnel Operation" section above.

After testing the full halo design at all yaw angles, the bottom vane of the model was removed using a hand held rotary cutting tool (seen in FIG. 16, Panel B), and the device was re-tested. However, due to the negative effect of this configuration on drag, no tests were carried out at different yaw angles, since there was no promising data to suggest it would act any differently. After finishing these rounds of tests, the top was then removed using the same method, and the device with just the sides was tested again, shown in FIG. 16, Panel C. This configuration showed very little promise as well, and so it was also not tested for different yaw angles.

All three configurations were tested at different wind tunnel speeds to determine how much effect the Reynolds number had on the $\Delta C_D$ values and drag reduction percentage. The question was whether the devices reduced drag proportionally at each speed, progressively or even regressively at higher wind speeds. The results found during the initial testing phase will now be discussed.

Initial Testing Results—Yaw Angle Study

The full Kato 158 mm circular arc halo geometry (FIG. 16A) was tested on a range of yaw angles: −9, −6, −3, 0, 3, 6, and 9 degrees. This device was compared with the Maragno and airfoil device at each angle to indicate whether there is any additional drag reduction advantage with a vane approach rather than a planar cavity approach.

FIG. 17 shows drag reduction results, in terms of $\Delta C_D$ as a function of the yaw angle. The graph plots two series of data points, one for Maragno's optimum planar cavity device, the other for the device being investigated, Kato's 158R optimum device. In all cases throughout this specification, a positive $\Delta C_D$ value indicates a reduction in drag.

It can be seen from FIG. 17, that Maragno's geometry outperforms the 158R geometry at all yaw angles. Error bars are included to indicate the calculated uncertainty. See Uncertainty Analysis section above for uncertainty calculations. From the graph, at zero degrees yaw, Maragno's device reduces drag nearly 93% more than the 158R device. (The 158R vaned device resulted in $\Delta C_D$=0.0066, while Maragno's device resulted in $\Delta C_D$=0.0942.)

One relevant observation of these yaw angle findings is that they show drag reduction actually increasing at higher yaw angles. The trend holds for both devices. Another interesting observation is that the yaw angle curve shows asymmetry around zero degrees yaw. Both devices have similar $\Delta C_D$ values at −3 and 3 degrees yaw, but the $\Delta C_D$ values at greater yaw angles differ greatly between the positive and negative directions. An adequate explanation for this asymmetry was not really found. For Maragno's device, the $\Delta C_D$ values drop off at −9 degrees yaw. The best possibility is that perhaps the sting did not have enough clearance, and made contact with the wind tunnel floor at larger negative yaw angles. Although this was not observed during the testing, it was brought up later, when taking the model out of the tunnel. If indeed happened, it would distort the side force numbers, and significantly alter $\Delta C_D$ values at that yaw angle.

The only trend that can be clearly seen from FIG. 17 is that Maragno's optimized device vastly outperforms the 158R halo device at all yaw angles.

Initial Testing Results—Yaw Angle Results Compared with Maragno's Results

Results shown in FIG. 17 indicate that when the yaw angle is increased, both devices actually reduced the drag more than they did at zero yaw. It is necessary to discuss this trend and compare it with previous results. While $\Delta C_D$ values and drag reduction percentages were similar to the numbers previously found in Maragno's thesis, the trend was opposite. Maragno found his design to have the most drag reduction at 0 degrees yaw, with $\Delta C_D$ decreasing with increasing yaw angle. Maragno's best case comparison at all yaw angles can be seen in FIG. 18. Perhaps the uncertainty of these values can explain the ambiguous results. In FIG. 17, the error bars are significant, and the uncertainty is fairly high, but still under 2%.

However, another reasonable explanation is that the difference in results is due to a difference in Reynolds numbers. The current wind tunnel study ran at a much higher velocity than previous studies at Clarkson. In current tests, the tunnel ran at approximately 37 m/s, which is about 1.7 times Maragno's test speed of 21.5 m/s. This would cause the Reynolds number to also be 1.7 times larger than in any previous Clarkson studies. This kind of difference has the potential to significantly affect flow properties. Maragno's wind tunnel experiments only ran at a Reynolds number of approximately 2.3e5. The current study's Reynolds number, 3.9e5 is much closer to the transitional Reynolds number of 5e5. The difference between studies could be that while previous studies were observed within a laminar range, the current study could be occurring within a transitional flow zone, close to the onset of turbulence. With the close proximity to a turbulent flow, the current study's flow would have acted significantly differently, dominated by inertial forces, which tend to produce random eddies, vortices and other flow fluctuations.

Initial Testing Results—Configuration Study

The second major investigation carried out during initial testing phase was aimed at determining what configuration of Kato's geometry is most successful in reducing drag. For this study, all tests were kept at zero yaw. Kato's geometry with the full halo, sides and top, and just sides was compared to Maragno's geometry. Each configuration was tested at three different wind speeds as well, to see how a higher Reynolds number would affect the drag reduction potential as well. The results of the study proved to be the most valuable findings of the initial tests. In FIG. 19, the results of this study are summarized in graph form.

FIG. 20 shows a comparison of configurations tested based on a drag reduction percentage. It must be stated here that due to the wind tunnel set-up, the drag percentage numbers are not taken just from the drag of the truck. Since there was no sting wind shield in the wind tunnel, the drag percentage is actually in relationship to the sting-truck model assembly, rather than the model alone. Therefore the total $C_D$ is the summation of $C_{D_{truck}}$ and $C_{D_{sting}}$. For incremental $\Delta C_D$ values, and all results on this basis, whether it's the truck or the sting-truck assembly does not have an effect. The change in $C_D$ will be the same regardless. However, it does have an effect on the drag reduction percentages. Consider the equations:

$$\text{Drag Reduction \%} = \frac{\Delta C_D}{C_{D_{total}}} * 100 \quad (1)$$

where, $$C_{D_{total}} = C_{D_{truck}} + C_{D_{sting}} \quad (1a)$$

As a result, the percentages could appear to be lower than if it were just the model's drag being reduced. The reader must understand that all drag reduction percentages included in this study are for the truck and sting assembly. The percentage values are still useful as an alternative way to compare and understand the effectiveness of each device tested. Therefore, comparing devices on the basis of drag reduction percentage of the assembly will still be reported in several instances in the results discussion.

It is clear that the 158R circular arc vanes are not nearly as successful at reducing drag as Maragno's design. In fact, the only consistent drag reducing design was the Full Halo set-up. The configuration shows potential, but is still greatly lacking in drag reduction, FIG. 20 shows it producing a maximum at just less than 1%. This is fairly insignificant when compared with Maragno's design which is consistently reducing about 9-10% of the assembly drag under these conditions. The other two configurations seem to vary slightly with wind speed. Unfortunately, they seem to produce even less drag reduction numbers than the full halo.

The most important aspect to take from this investigation involves the relationship between the sides only configuration and the full halo configuration. At a lower wind speed, the sides only configuration contributes to drag rather than reduces it. However, as the wind speed and Reynolds number increase, so do the $\Delta C_D$ values. No other configuration seems to have this trend. This is very significant, because results indicate that at the normal testing wind speed of approximately 37 m/s (approximate highway speeds), the 158R sides only configuration is just as effective as the full halo design. This finding alone is very promising, and can be very applicable to full-size designs. It implies that a much simpler and lighter two-sided vane design may be just as effective as a four-sided vane design.

Example 4

Wind Tunnel Models

Final Testing

This Example describes certain "final testing" of the "wind tunnel models." The final testing phase took the discoveries made during initial testing and utilized them further evaluate Kato's circular arc-shaped vane design. Final testing consisted of first an offset investigation for two separate geometries and then a yaw angle comparison for all successful designs. Added to the list of designs to evaluate was the airfoil vane concept, shown in FIG. 23. A description of testing that occurred during this phase is set forth herein.

The purpose of the second and final experimental testing session was to utilize an adjustable device that could be manipulated to reflect different vane offsets. In this way, a correlation could hopefully be found connecting vane offset and drag reduction. As suggested by Kato et al, there is a potential to reduce drag with circular arc-shaped vanes, but it is imperative to find the correct offset for the tractor trailer dimensions. To investigate offset effects, two Kato vane geometries were designed and created on the stereolithography machine along with a back plate that attaches to the truck model with magnets. Using the same optimal geometries investigated in the initial testing (Table 6), the top two performers from Kato's study were chosen to be constructed: the 158R-79C and the 124R-62C geometries. These name designations indicate the radius and chord length dimensions of each geometry. For example the 158R-79C model (shown in FIG. 16B) has 158 mm radius vanes, with a chord length of half that, 79 mm. FIG. 21 is a photograph that illustrates a comparison of the two vane sizes. The vanes were created with cantilevered members that slide into slots on the back plate. In this way, the vanes could be adjusted to whatever testing required. FIG. 22 shows photographs of the two arc designs with the back plate design.

In addition to the Kato geometry being tested, an alternative airfoil design was suggested and tested during the second round of wind tunnel testing. This design, shown below in FIG. 23, was also a vaned concept, except that it featured an airfoil cross-section, as opposed to the simple, curved, uniform thickness guide vanes of Kato.

There are a few important features of this geometry that makes it different from Kato's circular arc vanes. First of all, the airfoil cross-section of this model immediately sets it apart from Kato's uniform thickness guide vanes. Secondly, the leading edge of this design's vanes actually is ahead of the trailer end. This differs from Kato's vanes, which have a leading edge that is even with the aft face. Inspection of FIG. 24 shows that the leading edge is approximately 4-5 mm ahead of the end of the model. Finally, the overall length of this concept is much shorter than the circular arc concept. It is nearly one third of the length of Kato's geometry.

During the second testing phase, the offset investigation with the two Kato geometries was also carried out. The offset dimension investigated can be seen in FIG. 25 and FIG. 26. For this series of tests, Kato's scaled S values (as calculated in Table 6) were tested first. To determine if any trend existed, the offset was increased by 1 mm increments to an offset of 11 mm. The offset was subsequently decreased by the same increment until a zero offset was reached. At values around the calculated offset value, additional tests were run, with offsets being tested at an interval of 0.5 mm. In this way, a finer set of data points was obtained around the original calculated offset value. To insure that the offsets were correct, both sides were measured with a set of digital calipers, and then the vanes were tightened into place using set screws. An enlarged photograph of the vane offset and set screw assembly is illustrated in FIG. 25.

The airfoil design concept was tested during this time as well. The top performers of all designs were run at zero degrees for comparison. Then a yaw angle investigation was carried out for the airfoil design, between positive 0 and 9 degrees yaw. For each test run, the concept was compared with Maragno's planar cavity design, and an improvised 158R circular arc sealed cavity. This last design was discovered by experimenting with zero offset, then adding a top and bottom, creating a sealed cavity, as suggested by Maragno and Grover. The device is shown below in FIG. 27a. The device was crude, held together by duct tape, but despite the construction, still showed positive drag reduction. Also tested during this phase was another improvised device, the 124R circular arcs with no offset with the 158R top and bottom added to configuration. This device was similar to the 158R cavity, but it had a top and bottom which were a greater length than the sides. A photograph of the 124R improvisation is included next to the 158R geometry in FIG. 27b. All results from the final testing are discussed in the following section.

Final Testing Results—Offset Investigation

The first major investigation carried out during final test phase was the offset investigation. In this investigation, the drag reduction was investigated as a function of the design offset, the dimension shown previously in FIG. 26. Because of the findings in initial testing that suggest designs with just sides are just as effective as full halo designs, a configuration with just sides was the only one tested. Two of Kato's optimal geometries were investigated. All results can be seen in FIG. 28.

The offset study indicated mostly negative results. As FIG. 28 shows, both geometries tested yielded very little drag reduction at any offset. In fact, for the majority of offsets, increases in $C_D$ (or equivalently negative $\Delta C_D$ values) were observed. This indicates the addition, rather than reduction of drag on the model. Throughout the offset range of 2-11 mm, little evidence was found to connect specific offsets with drag reduction. There is no visible trend between increasing offset and the drag involved. Promising results were only observed for offsets less than 2 mm. The 124R geometry did have one other observed point where drag was reduced. At an offset of 4 mm, the 124R resulted in $\Delta C_D$=0.005. This point is the best idea of where a maximum offset would be, and yet the drag reduction of the truck-sting assembly is still practically negligible, around 0.5%.

In both geometry cases, the maximum drag reduction was observed at an offset of zero. With a zero offset, this configuration, in essence, ceases to be a vaned concept and instead becomes more of a boat tail concept. If there is an offset that optimizes drag, the study never indicates one offset over any others. Overall, this study perhaps gives one of the best indications that drag reduction through circular vanes, on a practical level, is not possible.

Final Testing Results—Yaw Angle Investigation

A subsequent yaw angle investigation was carried out during the final testing phase. This time, only the designs which were most successful at reducing drag were compared to each other. The most important additional design included in this test was the airfoil vane design. For this test, only yaw angles in a range from 0 to 9 degrees were able to be tested. A broken strain gauge late in testing prevented runs at negative yaw angles. In total, three designs were tested, then plotted with previous results for the 158R Full Halo design. The three designs that were tested were Maragno's original orthogonal cavity design, the airfoil design, and finally the improvised 158R sealed cavity design, shown in FIG. 27a. All results are plotted below on FIG. 29. Error bars are shown only on Maragno's design and the airfoil design.

There are three important observations relevant to these results. First of all, during initial testing, the yaw angle tests produced results for Maragno's design that differed from his findings from his own research. This final round of testing supports the initial yaw angle testing done for this thesis—Maragno's design again produced greater $\Delta C_D$ values at 9 degrees than at 0 degrees. The previous yaw angle study is shown in below, in FIG. 30. If FIGS. 29 and 30 are inspected and compared, the values for Maragno device and the Full Halo configuration are about the same in both tests. Perhaps the findings in this yaw angle test support the hypothesis that the higher Reynolds number during testing causes the changes in the $\Delta C_D$ values at different yaw angles.

The next interesting observation is the similar curves between both 158R designs. The difference between these is simply that the full halo configuration has an offset of 4.74 mm (see FIG. 16A) and the improvised sealed cavity has no offset, with the top and bottom duct-taped to the sides (see FIG. 27a). What is interesting about their yaw angle curves in FIG. 29 is that while the sealed cavity is much more effective at reducing drag than the offset halo, the curves have a very similar curve shape. The curves even look like they are offset by a $\Delta C_D$ value of 0.05. Both curves have their minimum $\Delta C_D$ value at 9 degrees, and their maximum at 6 degrees. This curve similarity seems to suggest that while the two designs have different offsets and even different mechanisms of reducing drag, the flow conditions are similar in both cases. Perhaps due to the geometry of the device, drag is similarly affected at each yaw angle. It may be that while devices of similar geometry may reduce drag in different amounts through a range of yaw angles, they seem to be somewhat related to each other.

The final observation that is worth discussion is the fact that two designs drop off in effectiveness at 9 degrees yaw. For both the airfoil design and the 158R full halo design, at 9 degrees yaw, a negative $\Delta C_D$ is observed. This is highly undesirable because a successful design should reduce drag at all yaw angles. Higher yaw angles are important to take into account because they occur frequently enough in highway conditions to warrant consideration in the final selection of a device for recommended highway use. These two designs may have to be further optimized if in fact they were to be made into full size devices. The negative change in drag reduction will have to be closer investigated before they can be recommended as effective devices.

Final Testing Results—Airfoil Vane Investigation

It is important to highlight the performance of the airfoil vaned design. This device was not optimized at all, yet the design was fairly effective and showed promising results. The design was tested multiple times at zero degrees yaw, then once at each yaw angle discussed herein. In FIG. 31 and FIG. 32 zero degree results are compared with Maragno's device. Error bars are included in the plot according to uncertainty calculations.

According to FIG. 31, the average $\Delta C_D$ value for the airfoil was approximately 0.048, translating into a combined truck and sting drag reduction of approximately 4.5%, while Maragno's design accounted for a $\Delta C_D$ value of 0.072, approximately 6.8% reduction of the total system drag. When compared to all other models tested, the airfoil design shows tremendous potential. Without any optimization or CFD analysis, the design is already showing drag reduction numbers not far from Maragno's optimized design, seen as the standard to which all other drag devices should be measured.

The airfoil design was also tested on a range of yaw angles. In these tests it was again compared to Marango's design, as well as other successful designs. These results have been discussed in the previous section,—Final Yaw Angle Investigation. In this test, unfortunately airfoil vanes didn't perform as well as hoped expected. At high yaw angles of 6 and 9 degrees, $\Delta C_D$ actually decreased. At 9 degrees, the device even exhibited a negative $\Delta C_D$, meaning it actually added to the model's drag. As stated earlier, this observed property is undesirable, and should be investigated thoroughly before recommending this design for highway testing.

Example 5

Summary of Testing Results

Although the initial testing did not result in any comparable results to what Maragno had determined, there were still some important observations that should be mentioned. A major result of the initial tests was the discovery that simply scaling up Kato's numbers was not effective for reducing significant drag. More investigation must go into finding the optimum geometry for the vanes, including dimensions like offset, vane curvature and arc length. Perhaps the most important discovery during initial testing occurred in the configuration investigation. Here evidence was found that a design exhibiting only side vanes may be just as effective at reducing drag as a design with four vanes, on the top, bottom and both sides. Both of these discoveries factored into the investigations that were chosen for final testing.

To summarize final testing, all designs were compared on the basis of $\Delta C_D$ values and drag reduction percentage. These results, all taken at zero degrees yaw were gathered together to be compared on a bar graph. These bar graphs are shown in FIGS. 33 and 34.

As can be seen, Maragno's original design continues to be the standard to reach for reducing drag. However, the 158R improvised sealed cavity (FIG. 26) performed very closely to Maragno's design. It is very significant that the top three most effective designs are all sealed cavities. It seems safe to assume that a sealed cavity design, regardless of whether it is planar or not, currently out-performs all other designs. The most effective vaned design was the airfoil geometry. Rounding out the bottom of devices tested are the top performing circular arc vaned designs. With the exception of the airfoil design, there is a significant performance gap between the vaned devices and the sealed cavity devices.

Example 6

Conclusions

Kato's Circular Vanes

Kato's geometry was tested for many independent factors affecting drag, to better understand how the design works and how to optimize it. Overall, very little promising data was gathered to support Kato's geometry as an effective drag-reducing device. From initial tests, a maximum drag reduction of less than 1% was observed. A promising discovery made was that devices with just sides were just as effective as full halo devices, however, no vane offset was found to produce very good drag reduction numbers. Regardless of the offset, both the 124R and 158R arc designs increased drag in almost all cases. The most effective Kato configurations were not nearly as effective as Maragno's device, the most successful configuration only reducing around 1% of sting-truck drag. When zero offset set-ups were tested, they resulted in more drag reduction than any other configuration. A top and bottom were added and the devices resulted in much larger $\Delta C_D$ values, around the same level as Maragno's. This leads to the conclusion that sealed cavity devices outperform guide vane devices in all cases.

Airfoil Vaned Design

Despite the fact that the airfoil vaned design was entered later into testing, and never went through initial testing, it was observed to be a viable option with drag reduction closer to the level of Maragno's device than any other device tested. Over multiple runs at zero degrees yaw, the airfoil had a maximum $\Delta C_D$ value of 0.065 and an average $\Delta C_D$=0.048. This is close to 4.5% of drag measured for the truck and sting assembly. Though these numbers are still just over half of Maragno's device, they are 4-5 times as effective as Kato's arc configurations.

There is one result that has negative potential. This is the fact that at a higher yaw angle of 9 degrees, the airfoil actually increased drag. From tests, at 0 degrees yaw, the design's ΔCD=0.048, while at 9 degrees yaw, ΔCD=−0.037. This flaw could be detrimental to the overall design concept. It will have to be looked into more closely to determine why this drop off in effectiveness occurs, and if it can be prevented. Since the design is so new, there is a strong possibility that a CFD analysis and study of the airfoil shape will provide answers and needed direction.

Example 7

Recommendations

Experimental Improvements

An embodiment of the present invention also includes recommendations. For example, the wind tunnel set up can be improved to provide for increased consistency. As Maragno suggested, this can start with the construction of a permanent calibration rig (see Maragno, D. & Visser, K. D. (2003) "The Effects of Aft Cavity Inset and Boat Tail Angle on Drag Reduction of Tractor Trailers," Report No. MAE-365, Department of Mechanical and Aeronautical Engineering, Clarkson University). Additionally, the force balance may be raised to shorten the required length of the mounting sting. This would reduce bending moment contributions to the drag and side force data. Additionally, a wind shield made of plastic of PVC piping could greatly decrease drag force contributions to the sting. While Maragno utilized a PVC shield, no wind shield was used for this research. If a wind shield was added, drag reduction percentage numbers would be more accurate, because drag on acting on the sting would be taken out of consideration. More accurate yaw positioning may be attained by constructing removable pegs in the splitter plate which would force exact positioning of the trailer model at a particular angle. Also, an improved sting collar design is recommended to better keep the model fixed at any angle. The current standard collar set-up with two only set screws is not sufficient. To secure the model on the sting is a delicate process because it is difficult to tighten down the collar evenly. As a result, if one is not careful in mounting the model, it could easily loosen on the sting. During one yaw angle test, this occurred and the model actually shifted on the sting so that it was no longer at the correct yaw angle. The test had to be run again after resetting and securing the model again. A better design might include a two piece clamping collar with set screws. In this way, the collar can be more easily tightened down, and it could deliver a distributed pressure force around the circumference of the sting, rather than two concentrated point forces as with the set-screws system.

Instrumentation may be substituted or replaced to reduce uncertainty in the analysis. Refer to the "Uncertainty Analysis" section for a table relating the uncertainty associated with each transducer used in the experimentation and for the propagation of each uncertainty into the overall drag coefficient uncertainty. The largest contributor to the overall uncertainty comes from the wind tunnel pressure differential transducer, with an uncertainty of approximately 4.2148 Pa. There is a much better replacement available in Clarkson's wind tunnel lab: the Mensor Series 2500 Digital Pressure Gauge. However, due to technology limitations, it was unable to be used as anything more than external pressure gauge. The computer used in the lab was unable to read its serial output. The Mensor features a pressure range from 0 to 10 in H20 with an accuracy of 0.01% of range giving a ±0.249 Pa uncertainty. This kind of accuracy would get rid of a large degree of measurement uncertainty. Replacing the current 10 in. pressure transducer with the Mensor is a high priority before any further wind tunnel testing.

Looking Forward

Although Kato's circular guide vanes were found to work on a limited basis, this research suggests that circular arc vanes are not the answer to the question of aft drag reduction in tractor trailers. It could be possible that full scale results would be different, due to Reynolds number scaling effects, turbulence levels, a thicker boundary or other factors. Although the Kato study produced dramatic bluff body drag reduction through guide vanes, it does not appear to be transferable to tractor trailers, perhaps because of ground proximity. Clarkson wind tunnel test results illustrate undesirable trends among models Kato's designs. Consequently, there is no real incentive to perform full size tests on this design because of its lack of performance. While there is still plenty of room for general vaned designs to effectively reduce drag, from all wind tunnel results, circular arc vanes are largely out of the question.

One guide vane design that has showed a lot of promise towards being an effective drag reduction device is the new airfoil vaned design. And it seems to be a feasible alternative to a planar cavity device. In a full scale application, the vane design could save a lot of material costs compared to the current planar cavity devices. It would be preferable if this research is followed by more research that digs deeper into the geometry surrounding the design. A full analysis of the airfoil cross section could be beneficial towards understanding the flow characteristics involved with this device. A CFD study of the device should preferably be carried out in the future as well. Instead, by varying parameters and dimensions in a CFD code the device geometry could be optimized. One issue that should be reviewed further is the apparent lack of performance of the airfoil at higher yaw angles (at least in these experiments). A better yaw angle study with a greater range of angles, possibly ±15°, would give a better idea about its performance. The present invention contemplates that a greater range of angles may be feasible under the right conditions. It would also be beneficial in the future to test the airfoil geometry in a sides-only configuration. These tests could empirically show if the results for Kato's vanes hold for an airfoil design as well.

While several embodiments of the invention have been discussed, it will be appreciated by those skilled in the art that various modifications and variations of the present invention are possible. Such modifications do not depart from the spirit and scope of the present invention.

What is claimed is:

1. A vehicle having an apparatus for reducing aerodynamic drag comprising:
    a vehicle having a front side, and an aft side located in a first plane with an aft perimeter, wherein said aft perimeter comprises a first vertical surface, a second vertical surface, a first horizontal surface and a second horizontal surface;
    a guide vane with an airfoil cross-section having a leading edge and a trailing edge, wherein:
        said leading edge is bulbous and tapers to the trailing edge,
        said guide vane is mounted around and to said aft perimeter along a portion of each of said first vertical surface, said second vertical surface, said first horizontal surface and said second horizontal surface,
        said leading edge faces and extends in a direction toward said front side beyond said first plane, wherein the portion of said guide vane mounted to said first horizontal surface is connected to the portion of said guide vane mounted to the first vertical surface and to the second vertical surface, and the portion of said guide vane mounted to said second horizontal surface is connected to the portion of said guide vane connected to the first vertical surface and to the second vertical surface; and wherein the guide vane is mounted and positioned continuously around the aft perimeter.

2. The vehicle of claim 1, wherein said vehicle is a trailer of a tractor trailer.

3. The vehicle of claim 2, wherein said guide vane is mounted around and to said aft perimeter along a portion of each of said first vertical surface and said second vertical surface.

4. The vehicle of claim 2, wherein said leading edge extends in a direction toward said front side 4-5 mm beyond said first plane.

5. The vehicle of claim 2, wherein said guide vane is mounted around and to said aft perimeter at a yaw angle of up to 9 degrees.

6. The vehicle of claim 5, wherein said guide vane is mounted around and to said aft perimeter at a yaw angle of up to 6 degrees.

7. The vehicle of claim 2, wherein said trailer comprises a sealed cavity.

\* \* \* \* \*